United States Patent [19]

Iba et al.

[11] Patent Number: 5,982,343
[45] Date of Patent: Nov. 9, 1999

[54] VISUAL DISPLAY APPARATUS

[75] Inventors: Yoichi Iba, Hachioji; Seiichiro Tabata, Hino; Takayoshi Togino, Koganei; Kunie Nakagiri, Hachioji, all of Japan

[73] Assignee: Olympus Optical Co., Ltd., Tokyo, Japan

[21] Appl. No.: 08/931,845

[22] Filed: Sep. 16, 1997

Related U.S. Application Data

[63] Continuation of application No. 08/273,991, Jul. 12, 1994, abandoned.

[30]     Foreign Application Priority Data

| Nov. 29, 1903 | [JP] | Japan | 5-274531 |
| Jul. 13, 1993 | [JP] | Japan | 5-173049 |
| Mar. 31, 1994 | [JP] | Japan | 6-063340 |

[51] Int. Cl.$^6$ ............... G09G 5/00; G02B 27/04
[52] U.S. Cl. .................. 345/8; 359/630; 359/631
[58] Field of Search ................ 345/8, 630, 13, 345/631; 348/36, 51–59

[56]          References Cited

U.S. PATENT DOCUMENTS

| 4,743,964 | 5/1988 | Allard et al. ............... 348/52 |
| 4,757,378 | 7/1988 | Hackett, Jr. et al. ......... 378/42 |
| 4,969,714 | 11/1990 | Fournier, Jr. et al. ....... 345/8 |
| 5,034,809 | 7/1991 | Katoh ...................... 348/53 |
| 5,124,821 | 6/1992 | Antier et al. .............. 345/8 |
| 5,198,928 | 3/1993 | Chauvin .................... 359/630 |
| 5,357,277 | 10/1994 | Nakayoshi et al. .......... 348/54 |
| 5,408,346 | 4/1995 | Trissel et al. ............ 359/631 |
| 5,469,185 | 8/1993 | Lebby et al. .............. 345/8 |
| 5,526,184 | 6/1996 | Tokuhashi et al. .......... 359/631 |
| 5,572,343 | 5/1993 | Okamura et al. ............ 345/8 |
| 5,682,173 | 8/1995 | Holakouszky et al. ........ 345/8 |

FOREIGN PATENT DOCUMENTS

| 3188777 | 8/1991 | Japan . |
| 5053057 | 3/1993 | Japan . |

*Primary Examiner*—Amare Mengistu
*Attorney, Agent, or Firm*—Pillsbury Madison & Sutro LLP

[57]              ABSTRACT

A visual display apparatus, for example, a head-mounted display apparatus, which enables an image to be observed at a wide field angle and high resolution. The apparatus includes a pair of two-dimensional display devices (4 and 5) disposed with their display surfaces facing each other, and two half-mirrors (6 and 7) which are paired with the display devices (4 and 5) and combined to each other in the shape of a V. The apparatus further includes a concave mirror (8) having a center axis coincident with the center axis of the half-mirrors (6 and 7) combined in a V shape. The two-dimensional display devices (4 and 5) are adapted to display images (11 and 10) each including an overlap region (9) and having an area wider than one half of the image for observation. The images (11 and 10) are combined together into one continuous image by the two half-mirrors (6 and 7) combined in a V shape.

36 Claims, 22 Drawing Sheets

(b)

(c)

(d)

(b)

(c)

(d)

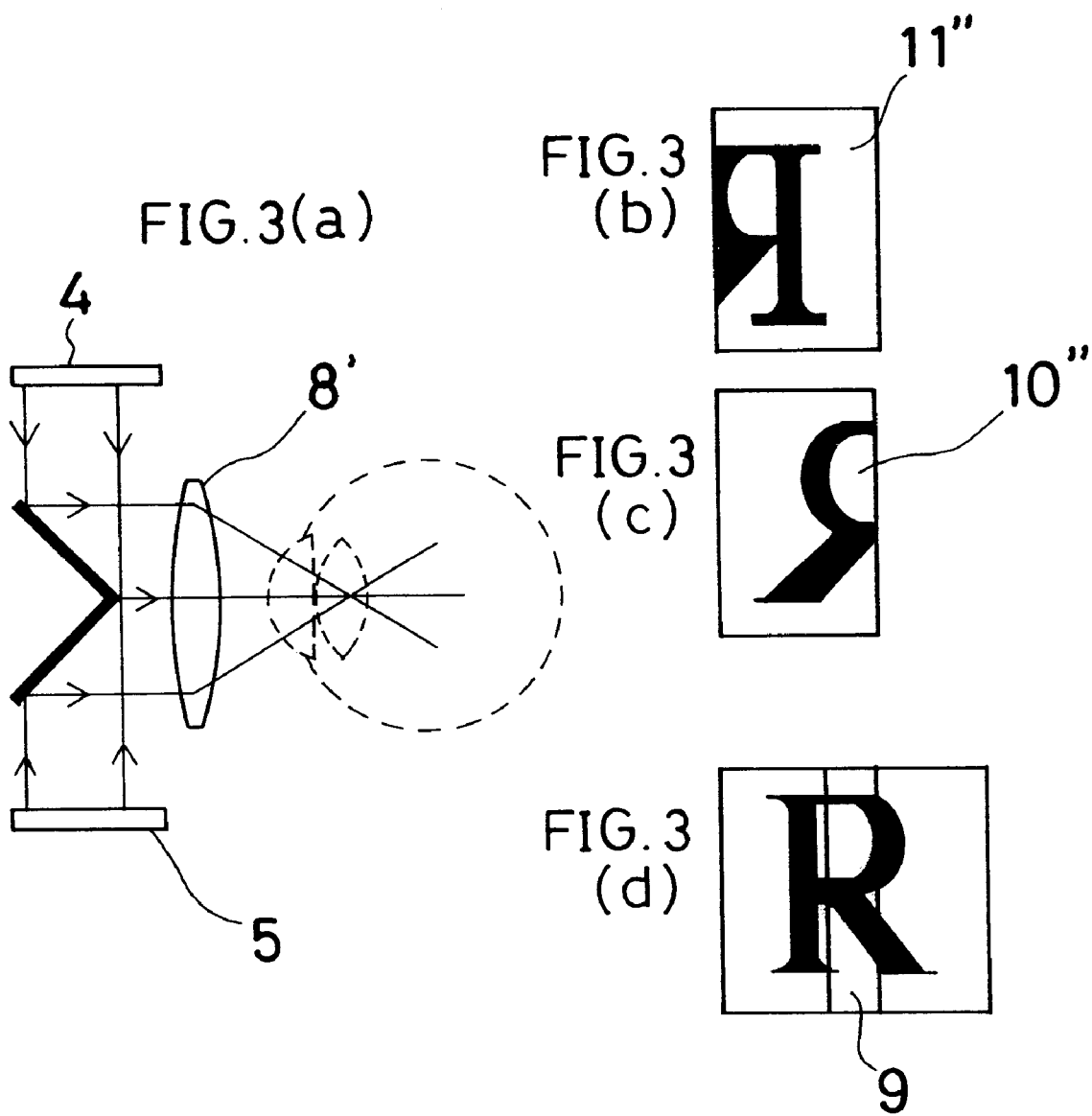

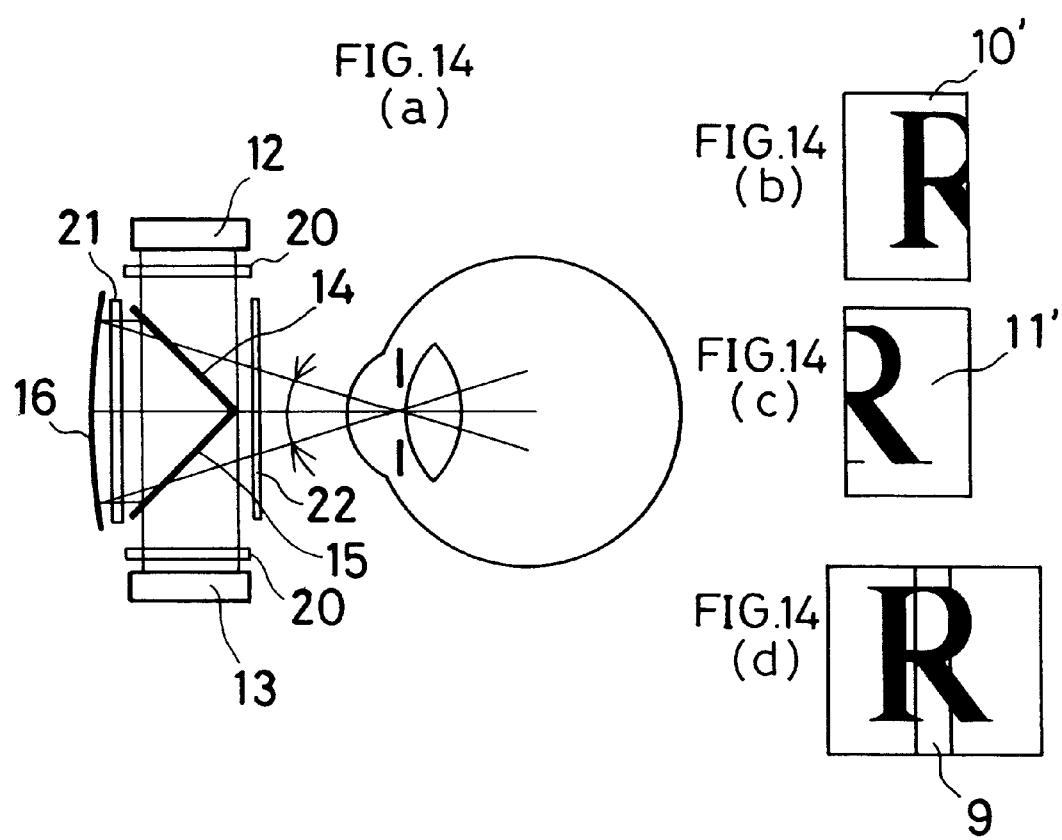
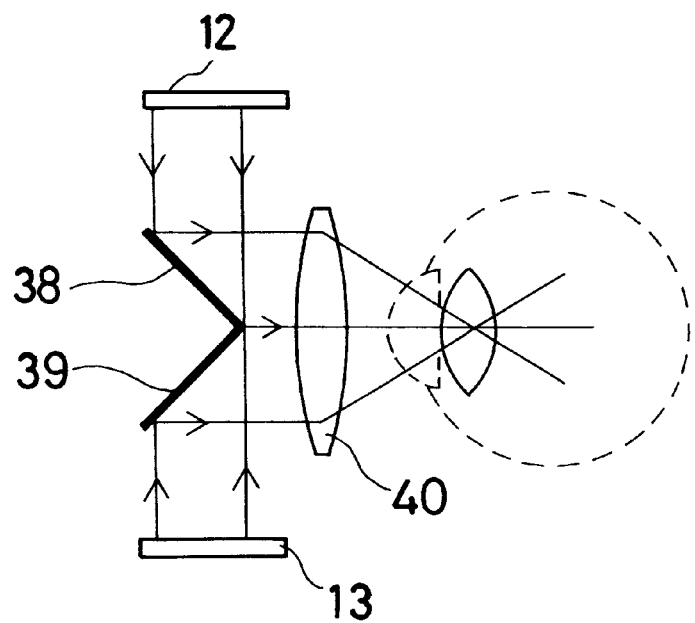

FIG.22(a)   FIG.22(b)   FIG.22(c)
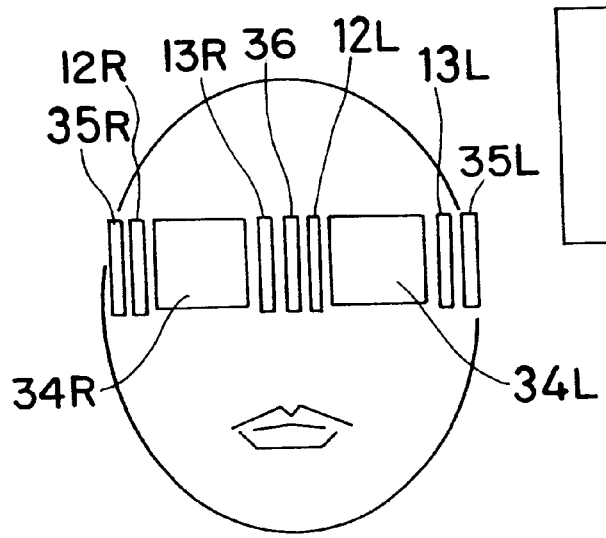
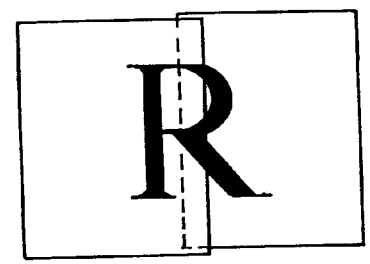
FIG.22(d)

VISUAL DISPLAY APPARATUS

This is a continuation of application Ser. No. 08/273,991, filed on Jul. 12, 1994, now abandoned.

BACKGROUND OF THE INVENTION

The present invention relates to a visual display apparatus and, more particularly, to a visual display apparatus, for example, a head-mounted display apparatus, which enables an image to be observed at a wide field angle and high resolution.

Helmet- and goggle-type head-mounted display apparatuses have heretofore been developed for the purpose of enabling the user to enjoy virtual reality or wide-screen images by oneself.

Incidentally, a conventional display apparatus designed to be mounted on the observer's head is known in which, as shown in FIG. 38, an image displayed on a two-dimensional display device 1, e.g., a liquid crystal display device, is reflected by a half-mirror 2 which is disposed in front of a user's eyeball at a tilt of 45° to the user's visual axis, and the reflected image is enlarged by a concave mirror 3 which is disposed forwardly of the half-mirror 2, and then the enlarged image is passed through the half-mirror 2, thereby enabling the user to observe the enlarged displayed image (see Japanese Patent Application Laid-Open (KOKAI) No. 3-188777). It should be noted that the two-dimensional display device 1 is disposed in the vicinity of the front focal point of the concave mirror 3.

Regarding the optical system shown in FIG. 38, let us consider the pass area of the chief ray on the assumption that the distance (working distance) between the above-described optical system and the user's eyeball is WD, the diameter of the concave mirror 3 is D, and the thickness of the optical system is t. On the above assumption, the following expression holds:

$$D = 2(t + WD)\tan(\Theta/2)$$

$$t = D$$

$$t\{1 - 2\tan(\Theta/2)\} = 2WD\tan(\Theta/2)$$

$$\therefore t = 2WD\tan(\Theta/2)/\{1 - 2\tan(\Theta/2)\}$$

It should be noted that D and t are approximately equal to the vertical and horizontal (as viewed in the figure) widths, respectively, of the half-mirror 2 tilted at 45°. Consequently, D ant t are approximately the same.

In order to enable the conventional head-mounted display apparatus to be conveniently used, WD must be set in the range of from 10 mm to 25 mm. In a case where WD is 20 mm and the field angle θ is 40°, for example, it will be understood from the above expression that the thickness t of the optical system becomes considerably large, i.e., t=53 mm. Moreover, it is also necessary to ensure a pass area for subsidiary rays in addition to that for the chief ray in actual practice. Therefore, it is necessary to further increase the size of the optical system.

In addition, since a small-sized two-dimensional display device does not have a sufficiently large number of pixels, when an image that is displayed on such a small-sized two-dimensional display device is enlarged for observation, satisfactorily high resolution cannot be obtained. Under these circumstances, the present inventor considered arranging a plurality of such display devices in side-by-side relation to obtain a wide screen. However, a lightweight liquid crystal display device is generally used for a display apparatus of the type which is mounted on the user's head as in the case of a head-mounted display apparatus, and as shown in the front view of FIG. 39, such a liquid crystal display device has a display screen G surrounded by the peripheral portion of a substrate K. Therefore, when a plurality of such display devices are arranged in side-by-side relation, the substrate portions K of the adjacent display devices interfere with each other, thus giving rise to a problem.

Next, U.S. Pat. Nos. 5,198,928, 4,743,964 and 5,357,277 are related art using two CR displays or LCDs (Liquid Crystal Displays) as two-dimensional display devices. However, in any of the prior art, two 2-dimensional display devices are provided for observation with the left and right eyes. Accordingly, the right eye sees only the image of the two-dimensional display device for the right eye, and the left eye sees only the image of the two-dimensional display device for the left eye. In other words, the image of only one two-dimensional display device is led to one eye.

The U.S. Pat. No. 5,408,346 is related art in which the images of two 2-dimensional display devices are led to one eye. The prior art discloses an arrangement in which two 2-dimensional display devices are superimposed on one another to double resolution (see FIG. 1 of U.S. Pat. No. 5,408,346), and another arrangement in which only the image of one two-dimensional display device is projected as an enlarged image, and the image of the other two-dimensional display device is not enlarged but superimposed on the inner portion of the enlarged projected image of the first-mentioned two-dimensional display device, thereby enabling the inner portion of the projected image to have high resolution (see FIG. 2 of U.S. Pat. No. 5,408,346). However, neither of the arrangements contain an arrangement in which two 2-dimensional display devices are adapted to respectively display the images of approximately halves of an image to be viewed by the observer. Accordingly, if it is intended to show an image of wide field angle to the observer, the sizes of the two-dimensional display devices and the associated ocular optical system increase correspondingly, making it impossible to realize a compact structure.

SUMMARY OF THE INVENTION

In view of the above-described problems of the conventional technique, it is an object of the present invention to provide a visual display apparatus, e.g., a head-mounted display apparatus, which is designed so that an image can be observed at a wide field angle and high resolution.

It is another object of the present invention to provide a visual display apparatus, e.g., a head-mounted display apparatus, which provides a wide field angle and has a large pupil diameter.

To attain the above-described objects, the present invention provides a visual display apparatus having a two-dimensional display device, and an ocular optical system for projecting an image formed by the two-dimensional display device and for forming an exit pupil to lead the image into an observer's eyeball. The two-dimensional display device includes a first image display device for displaying a first image which includes at least a part of the image led to the observer's eyeball, and a second image display device for displaying a second image which includes another part of the image that is different from the image displayed by the first image display device. The ocular optical system includes a first reflecting surface for reflecting the first image formed by the first image display device, a second reflecting surface for reflecting the second image formed by the second image display device, and an optical system of positive power which projects a composite image of the first and second images as an enlarged image and leads it into the observer's eyeball. The first and second reflecting surfaces are disposed at an angle to each other.

In the above arrangement, the optical system of positive power is preferably a concave mirror.

Both the first and second reflecting surfaces may be disposed between the first and second image display devices.

The arrangement may also be such that the first and second reflecting surfaces are first and second half transmitting-reflecting surfaces, respectively, and the optical system of positive power has a third half transmitting-reflecting surface which is disposed so that one end thereof lies between the first image display device and the first half transmitting-reflecting surface, and the other end thereof lies between the second image display device and the second half transmitting-reflecting surface.

Further, the arrangement may be such that the first and second reflecting surfaces are first and second half transmitting-reflecting surfaces, respectively, and the optical system of positive power has a third half transmitting-reflecting surface, and that the first and second image display devices are disposed so that the optical axes of these display devices each intersect an outside world optical axis for observing an outside world image from the exit pupil position, and the first and second image display devices are substantially in axial symmetry with respect to the outside world optical axis, and further that the first or second half transmitting-reflecting surface and the third half transmitting-reflecting surface lie between the first image display device and the outside world optical axis, and the second or first half transmitting-reflecting surface and the third half transmitting-reflecting surface lie between the second image display device and the outside world optical axis.

In addition, each of the first and second reflecting surfaces may have a planar configuration.

The angle made between the first and second reflecting surfaces may be an obtuse angle.

The respective end surfaces of the first and second reflecting surfaces are preferably connected together.

The optical system of positive power may include a wave plate having a curved surface configuration.

Further, the arrangement may be such that at least one of the first and second reflecting surfaces has an outside world optical axis passing therebetween, and that the -optical system of positive power is provided in association with each of the first and second display devices, that is, there are provided a total of two optical systems of positive power, and the first and second image display devices, together with the associated optical systems of positive power, are disposed to face each other across the outside world optical axis.

The arrangement may also be such that at least one of the first and second reflecting surfaces has an outside world optical axis passing therebetween, and that the composite power of optical systems provided on the outside world optical axis is approximately zero.

When the optical system of positive power is formed from a concave mirror, it is preferable to provide an air spacing between the first reflecting surface and the concave mirror and another air spacing between the second reflecting surface and the concave mirror.

It is also possible to dispose a transparent member having a medium whose refractive index (n) is larger than 1 (n>1) between the first reflecting surface and the concave mirror and also between the second reflecting surface and the concave mirror.

In addition, the present invention provides a visual display apparatus having a two-dimensional display device, and an ocular optical system for projecting an image formed by the two-dimensional display device and for forming an exit pupil to lead the image into an observer's eyeball. The two-dimensional display device includes a right two-dimensional display device for the observer's right eye, and a left two-dimensional display device for the observer's left eye. The right and left two-dimensional display devices each have a plurality of display devices arranged to share a portion of each other's image displayed, so that the image led to each observer's eye by the ocular optical systems is projected in such a manner that among the images formed by the display devices, the shared image portions are superimposed on one another.

In the above arrangement, the plurality of display devices may be disposed with their image display surfaces facing each other in parallel.

The basic arrangement and function of the visual display apparatus according to the present invention will be described below with reference to FIGS. 1(*a*) to 3(*d*).

As shown in FIG. 1(*a*), the visual display apparatus of the present invention includes a pair of two-dimensional display devices 4 and 5 which are disposed with their display surfaces facing each other, and two half-mirrors 6 and 7 which are paired with the display devices 4 and 5 and combined to each other in the shape of a V as viewed in the figure. The visual display apparatus further includes a concave mirror 8 having a center axis coincident with the center axis of the two half-mirrors 6 and 7 combined in a V shape. Although in FIG. 1(*a*) the half-mirrors 6 and 7 are disposed closer to the display devices 4 and 5, respectively, the half-mirrors 6 and 7 may be disposed closer to the display devices 5 and 4, respectively, as shown in FIG. 2(*a*). Further, the concave mirror 8 may be replaced by a convex lens 8', as shown in FIG. 3(*a*).

In the above-described arrangement, the two display devices 4 and 5 are adapted to display images 11 and 10 [shown in FIGS. 1(*b*) and 1(*c*)] or 11' and 10' [shown in FIGS. 2(*c*) and 2(*b*)] or 11" and 10" [shown in FIGS. 3(*b*) and 3(*c*)], respectively. These display images 11 and 10 (11' and 10', or 11" and 10") each have an area wider than a half of an image "R" which the display apparatus finally projects, as shown in FIGS. 1(*d*), 2(*d*) and 3(*d*). That is, each display image includes an overlap region 9 of the image "R". The display images 11 and 10 (11' and 10', or 11" and 10") are reflected by the two half-mirrors 6 and 7, which are combined together in a V shape, such that the image displayed on the two-dimensional display device 4 is reflected by the half-mirror 6, while the image displayed on the two-dimensional display device 5 is reflected by the half-mirror 7. As a result, the two images are combined together into one continuous image. This image is further reflected by the concave mirror 8 or refracted by the convex lens 8' to form an image with an enlarged area. Thus, the user can observe the enlarged image.

In particular, the formation of the enlarged image by the concave mirror 8 in the arrangements shown in FIGS. 1(*a*)

and 2(a) is attended with minimal aberration and hence makes it possible to obtain a clear image at a wide field angle. Therefore, these arrangements are suitable for a case where a wide field angle is needed. As the field angle becomes wider, the overall thickness of the optical system decreases considerably in comparison to the optical system according to the conventional technique. Let us make a rough estimate of the thickness t of the optical system shown in FIG. 1(a) on the basis of the chief ray pass area. It should be noted that although D=t in the conventional optical system shown in FIG. 38, D=2t in the optical system according to the present invention, as will be clear from FIGS. 1(a) and 2(a):

$$D = 2(t + WD)\tan(\Theta/2)$$

$$2t\{1 - \tan(\Theta/2)\} = 2WD\tan(\Theta/2)$$

$$\therefore t = WD\tan(\Theta/2)/\{1 - \tan(\Theta/2)\}$$

Accordingly, in a case where the working distance WD is 20 mm and the field angle θ is 40°, the thickness t of the optical system is estimated to be 11.5 mm from the above expression. In actual practice, the thickness t needs to be larger than the above value because of the necessity of ensuring a pass area for subsidiary rays. Nevertheless, the thickness t reduces to about ⅕ of the thickness of the conventional optical system calculated under the same conditions, i.e., 53 mm. Thus, it is certain that a great improvement can be made in the thickness.

Further, since the display devices 4 and 5 are disposed in the vicinity of the front focal point of the concave mirror 8 and the user's pupil lies in the vicinity of the back focal point of the concave mirror 8, the optical path length from the concave mirror 8 to each of the display devices 4 and 5 and the optical path length from the concave mirror 8 to the user's eye are approximately equal to each other. Accordingly, it will be readily understood from FIGS. 1(a) and 2(a) that the optical paths s and t have the same length, and so do the optical paths s' and t', and that for the same WD, s' is shorter than s. That is, in an optical system of the type in which the edge of the half-mirrors 6 and 7, which are combined in the shape of a V, lies on the side of the optical system which is opposite to the concave mirror 8, as shown in FIG. 2(a), it is also possible to reduce the size of the optical system in the vertical direction as viewed in the figure.

In addition, since one continuous image is formed by using two display devices 4 and 5, the effective number of pixels is about double the number of pixels of one display device. Accordingly, high resolution can be achieved. If the pixels of the display devices 4 and 5 for the overlap region 9 are disposed so that the pixels are a half-pitch offset from each other when the images displayed by the two display devices 4 and 5 are combined together by the half-mirrors 6 and 7, a higher resolution can be obtained.

In the present invention, further, two half-mirrors may be arranged in parallel in the shape of an X as viewed from a side thereof instead of using two half-mirrors combined in a V shape, as shown in embodiments described later.

In the arrangement of the present invention that a third half transmitting-reflecting surface is disposed between the first and second image display devices and the first and second half transmitting-reflecting surfaces, the image display devices and the third half transmitting-reflecting surface can be brought close to each other without mechanical interference and eclipse. Therefore, the field angle can be widened. Further, since there is nothing in the arrangement that prevents an increase in size of the third half transmitting-reflecting surface, it is possible to increase the size of the third half transmitting-reflecting surface and hence possible to enlarge the pupil diameter.

According to the present invention, the images of approximately halves of an image shown to an observer are displayed by two 2-dimensional display devices, respectively, and the two images are joined together in an eye of the observer, thereby enabling the two dimensional display devices and the associated ocular optical system to be made compact in size even when it is intended to show an image of wide field angle to the observer.

If the two images are arranged to overlap each other at the joint thereof, it is possible to increase resolution only at the overlapping portion.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3(a) shows a third basic form of the visual display apparatus according to the present invention.

FIGS. 3(b), 3(c) and 3(d) show images displayed by the visual display apparatus shown in FIG. 3(a) and a composite image obtained with the visual display apparatus.

FIG. 14(a) shows an essential part of a tenth embodiment of the visual display apparatus according to the present invention.

FIGS. 14(b), 14(c) and 14(d) show images displayed by the visual display apparatus shown in FIG. 14(a) and a composite image obtained with the visual display apparatus.

FIG. 15 shows an essential part of an eleventh embodiment of the visual display apparatus according to the present invention.

FIG. 22(a) shows an essential part of a visual display apparatus in which constituent elements are arranged horizontally.

FIGS. 22(b), 22(c) and 22(d) show images displayed by the visual display apparatus shown in FIG. 22(a) and a composite image obtained with the visual display apparatus.

DESCRIPTION OF THE PREFERRED EMBODIMENTS

Figure 4A:
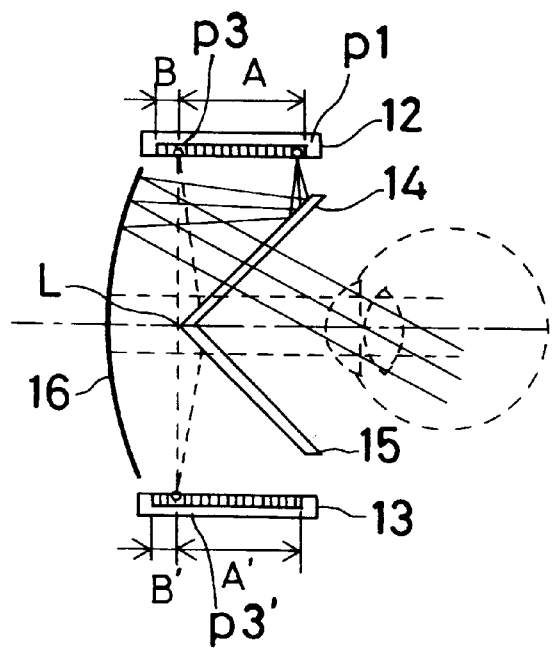
FIGS. 4(a), 4(b) and 4(c) show an essential part of a first embodiment of the visual display apparatus according to the present invention.
Figure 4B:
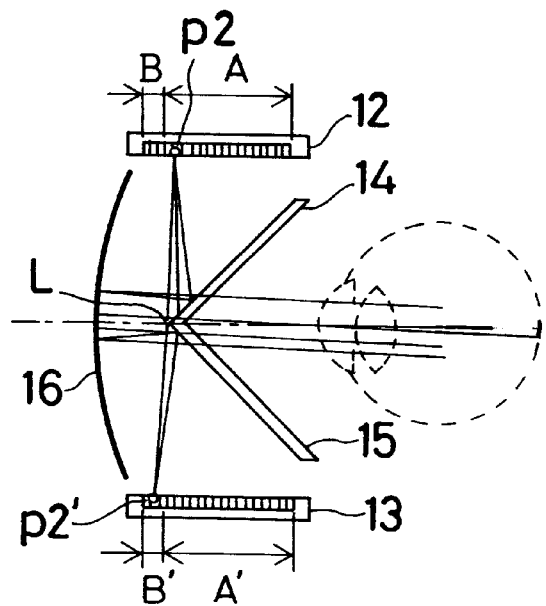
Figure 4C:
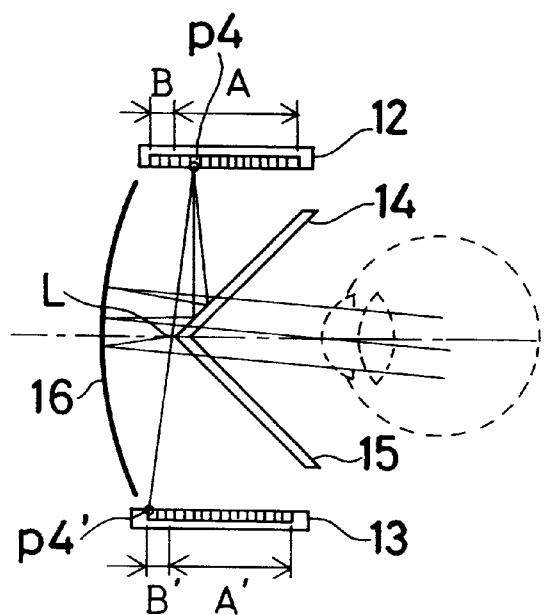
Figure 4D:
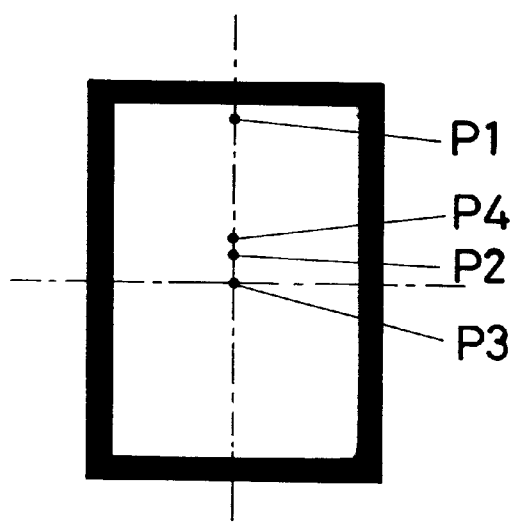
FIG. 4(d) shows an image for observation obtained by the first embodiment.

Some embodiments of the visual display apparatus according to the present invention will be described below.
First Embodiment:

FIGS. 4(a) to 4(c) show an essential part of this embodiment. In these figures, reference numerals 12 and 13 denote two-dimensional display devices. Half-mirrors 14 and 15 are combined at right angles to each other. Reference numeral 16 denotes a concave mirror. FIG. 4(d) shows an image (observation image) that is observed with the display apparatus of this embodiment. It should be noted that the half-mirrors 14 and 15 are each produced by providing half-mirror coating on the surface of a louver type filter used as a substrate, as described later.

Figure 1A:
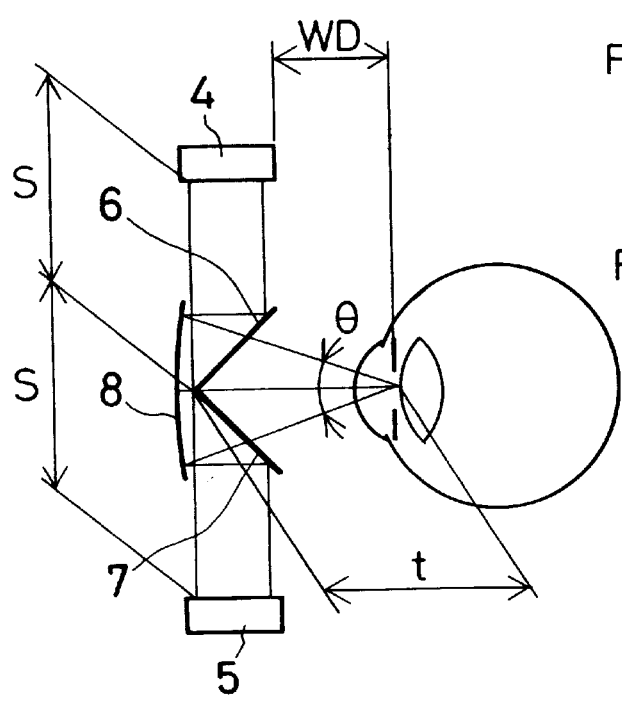
FIG. 1(a) shows a first basic form of the visual display apparatus according to the present invention.
Figure 1:
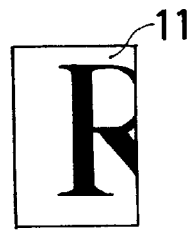
FIGS. 1(b), 1(c) and 1(d) show images displayed by the visual display apparatus shown in FIG. 1(a) and a composite image obtained with the visual display apparatus.
Figure 1:
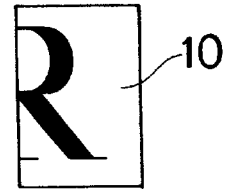
Figure 1:
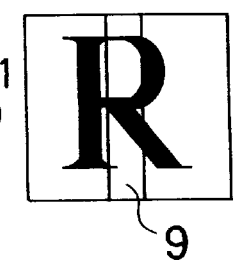
Figure 2A:
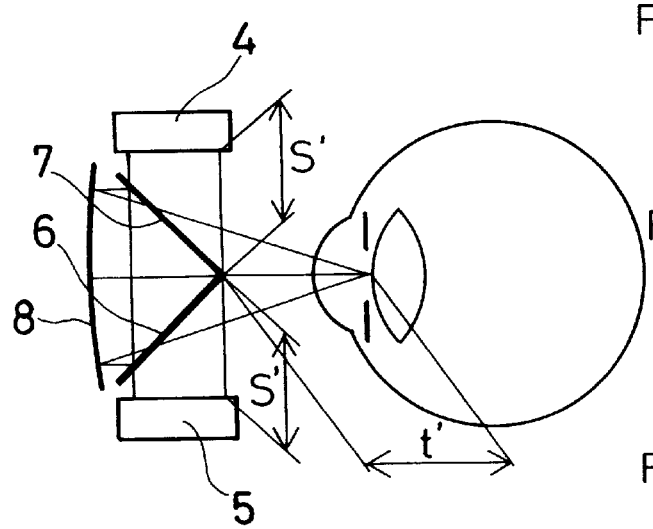
FIG. 2(a) shows a second basic form of the visual display apparatus according to the present invention.
Figure 2:
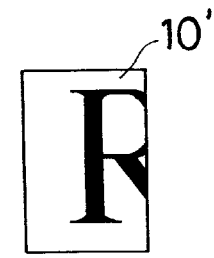
FIGS. 2(b), 2(c) and 2(d) show images displayed by the visual display apparatus shown in FIG. 2(a) and a composite image obtained with the visual display apparatus.
Figure 2:
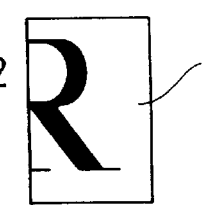
Figure 2:
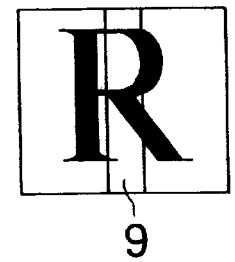

In this embodiment, an image that is externally sent to the visual display apparatus by the operation of an image signal processing device (not shown) is divided into two images each having an area larger than one of two equally divided parts of the image. That is, each of the two divided images includes an upper or lower half (or a left or right half) of the original image and an overlap region [i.e., a region similar to the region 9 in FIG. 1(d)]. The two image signals are sent to the two-dimensional display devices 12 and 13. The two-dimensional display devices 12 and 13 have regions A and A' defined on their display surfaces to display the upper and lower (or right and left) halves, respectively, of the observation image sent to the visual display apparatus. In addition, regions B and B' are defined on the display surfaces of the two-dimensional display devices 12 and 13. The region B displays the upper end portion of the lower half (or the right end portion of the left half) of the observation image, while the region B' displays the lower end portion of the upper half (or the left end portion of the right half) of the observation image. In other words, the two-dimensional display device 12 displays an image composed of the regions A and A', while the two-dimensional display device 13 displays an image composed of the regions B and B'. These two display images are each slightly larger than one of the upper and lower halves (or the left and right halves) of the observation image and have a part of it in common. The common image display portions of the two-dimensional display devices 12 and 13 are adapted to display the corresponding images at respective points which are in 180° positional relation to each other with respect to the edge L of the half-mirrors 14 and 15 combined together at right angles. Therefore, when the images of the two-dimensional display devices 12 and 13 are reflected by the half-mirrors 14 and 15, respectively, the divided images are optically combined into one continuous image. The concave mirror 16 reflects this image and forms an enlarged image in the air.

The way in which a bundle of light rays emitted from each point on the two-dimensional display devices 12 and 13 forms an image will be described below in detail by using several points on the two-dimensional display devices 12 and 13 as representatives. First, the way in which an image in a peripheral portion of the observation image is formed will be explained by taking the formation of an observation image P1 [see FIG. 4(d)] as an example. Referring to FIG. 4(a), a bundle of light rays emitted from a point p1 on the display surface of the two-dimensional display device 12 has a chief ray which is perpendicular to the display surface of the two-dimensional display device 12. The bundle of rays is first reflected by the half-mirror 14 toward the concave mirror 16. The concave mirror 16 has its front focal point in the vicinity of the display surface of each of the two-dimensional display devices 12 and 13. Accordingly, the bundle of rays is reflected by the concave mirror 16 to become a bundle of approximately parallel rays. The ray bundle passes through the half-mirror 14 and forms an exit pupil at the back focal point of the concave mirror 16. When the user looks through the apparatus by placing his or her pupil at the exit pupil position, it is possible to observe an aerial image P1 [FIG. 4(d)] of p1 displayed by the two-dimensional display device 12. Thus, a peripheral portion of the observation image is formed from only an image displayed by either the two-dimensional display device 12 or 13.

Next, the way in which an image P2 [FIG. 4(d)] in the vicinity of the center of the observation image is formed will be explained. Referring to FIG. 4(b), the image P2 is a composite projected image of a display point p2 on the two-dimensional display device 12 and a display point p2' on the two-dimensional display device 13. The points p2 and p2' are in 180° positional relation to each other with respect to the edge L of the half-mirrors 14 and 15, as described above, and display the same image. Because of the positional relationship between these points, the images reflected by the half-mirrors 14 and 15 are formed at the same position. For the bundle of rays emitted from either p2 or p2', not the whole but only a part of the ray bundle is reflected by the half-mirror 14 or 15 toward the concave mirror 16 because the half-mirror 14 or 15 is not sufficiently long to reflect the whole bundle of rays. However, considering the rays emitted from the two points p2 and p2' as a whole, they form a ray bundle having a predetermined diameter which is the same as the that of the bundle of rays from the point p1 that is reflected by the half-mirror 14. The resulting ray bundle is reflected by the concave mirror 16 to become a bundle of approximately parallel rays and forms an enlarged image in the air, thus forming an exit pupil that satisfies a predetermined pupil diameter at the exit pupil position in the same way as in the case of the bundle of rays from the point p1.

Next, the formation of an image P3 [FIG. 4(d)] in the center of the observation image will be explained. Referring to FIG. 4(a), display points on the two-dimensional display devices 12 and 13 that form the image P3 are p3 and p3'. Particularly, these two points are not only in 180° positional relation to each other with respect to the edge L of the half-mirrors 14 and 15 as in the case of the points p2 and p2' but also in such positional relation to each other that the imaginary straight line connecting the two points p3 and p3' intersects perpendicularly to the optical axis of the concave mirror 16. In other words, the point p3 lies on the border between the regions A and B, and the point p3' similarly lies on the border between the regions A' and B'. Bundles of rays emitted from these two points are combined together at the half-mirrors 14 and 15 to form one normal ray bundle having a predetermined diameter, which is then reflected by the concave mirror 16 and forms the image P3 [see FIG. 4(d)].

Next, image formation with regard to points p4 and p4' on the two-dimensional display devices 12 and 13 will be explained with reference to FIG. 4(c). The point p4 lies at the border between the region where a bundle of rays emitted from this point is totally reflected by the half-mirror 14 in the same way in the case of the point p1 and the region where a part of the ray bundle cannot be reflected in the same way as in the case of the point p2. For a display point between at least the point p4 and the point p3, a point corresponding to it must be ensured on the two-dimensional display device 13 in the same way as in the case of the point p2, for which the corresponding point p2' is provided. It should be noted that the point that corresponds to p4 is p4'. The same is the case with each point on the two-dimensional display device 12 that correspond to a point on the two-dimensional display device 13.

Figure 5A:
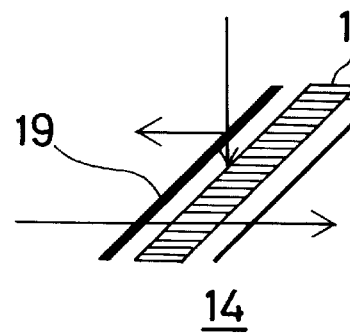
FIGS. 5(a) and 5(b) are fragmentary sectional views each showing a half-mirror that uses a louver type filter substrate.
Figure 5B:
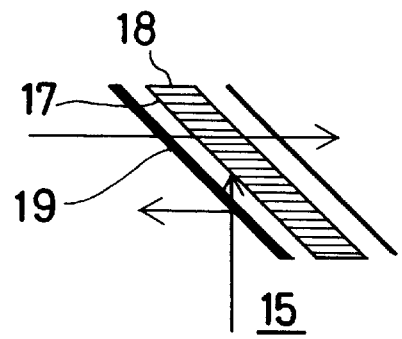

It should be noted that if rays of light emitted from the two-dimensional display devices 12 and 13 pass through the respective half-mirrors 14 and 15 and are then reflected by the half-mirrors 15 and 14, these reflected rays travel toward the user's eye, causing flare. Therefore, such reflected rays must be cut off somewhere. Accordingly, the half-mirrors 14 and 15 are each produced by providing half-mirror coating 19 on the surface of a louver-type filter substrate. FIGS. 5(a) and 5(b) are fragmentary sectional views of the half-mirrors 14 and 15. The louver type filter is a filter which has light-transmitting openings 17 and light-blocking walls 18, which are alternately formed as shown in the figure, to pass light in a specific direction but block it in another specific direction. With the half-mirrors 14 and 15 each using the louver type filter as a substrate, even if light from the two-dimensional display devices 12 and 13 passes through the half-mirror coating portions 19 provided on the surfaces of the substrates, the light is cut off by the louver type filter portions. Therefore, there is produced no light that causes flare. Meantime, the reflected light from the concave mirror 16 can pass through the louver filter portions after passing through the half-mirror coating portions 19. It should be noted that the pitch of the light-blocking walls 18 is preferably set at 0.1 mm or more. If the pitch is smaller than 0.1 mm, the observation image is disordered by the diffraction of light.

Figure 6:
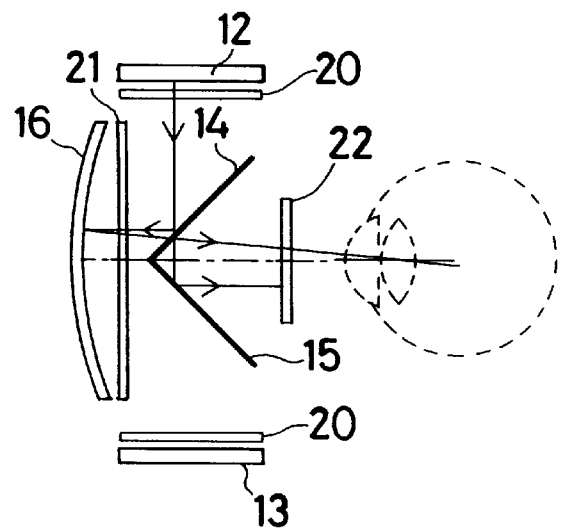
FIG. 6 shows an essential part of a second embodiment of the visual display apparatus according to the present invention.

Second Embodiment:

A second embodiment of the present invention will be explained with reference to FIG. 6. This embodiment is the same as the first embodiment except for some portions of the arrangement. Therefore, only the portions of the arrangement in which this embodiment differs from the first embodiment will be explained below. In the figure, reference numeral 20 denotes polarizers (polarizing plates), 21 a λ/4 plate (quarter-wave plate), and 22 an analyzer (polarizing plate). The half-mirrors 14 and 15 are each produced by providing half-mirror coating on the surface of an ordinary glass substrate in place of the louver type filter substrate used in the first embodiment. Light rays emitted from the two-dimensional display device 12 pass through the polarizer 20 to become linearly polarized light, which is then reflected by the half-mirror 14. However, a part of the light passes through the half-mirror 14 and is then reflected by the half-mirror 15 toward the user's eye. If the reflected light reaches the user's eyeball, it would cause flare. However, since the analyzer 22 is disposed in front of the user's eyeball such that the direction of polarization of the analyzer 22 is perpendicular to that of the reflected light, the light is blocked by the analyzer 22 and it does not reach the user's eyeball.

Meantime, the reflected light from the half-mirror 14 passes through the λ/4 plate 21 and is reflected by the concave mirror 16. Then, the reflected light passes through the λ/4 plate 21 again. Since the light passes through the λ/4 plate 21 twice, the direction of polarization of the light rotates 90° and thus becomes parallel to the direction of polarization of the analyzer 22. Accordingly, the light passes through the analyzer 22 to reach the user's eyeball. The same is the case with light that is emitted from the two-dimensional display device 13. Thus, the user can observe a flareless clear image.

Figure 7:
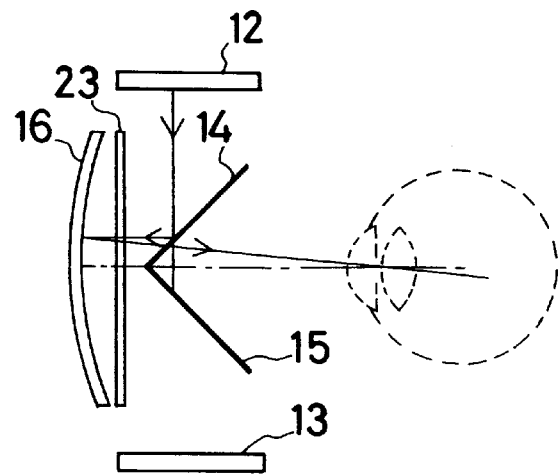
FIG. 7 shows an essential part of a third embodiment of the visual display apparatus according to the present invention.

Third Embodiment:

A third embodiment of the present invention will be explained with reference to FIG. 7. This embodiment is the same as the first embodiment except for some portions of the arrangement. Therefore, only the portions in which this embodiment differs from the first embodiment will be explained below. In the figure, reference numeral 23 denotes a rock crystal wave plate having a thickness of 1 mm or more. The substrates of the half-mirrors 14 and 15 are not louver type filter substrates but linearly polarizing plates whose directions of polarization are perpendicular to each other. The obverse surface of each substrate is provided with half-mirror coating, while the reverse surface is provided with anti-reflection coating.

Light rays emitted from the two-dimensional display device 12 are reflected by the half-mirror 14. However, a part of the light passes through the half-mirror 14, and the transmitted light becomes linearly polarized light because the half-mirror substrate is a linearly polarizing plate. Then, the transmitted light is incident on the half-mirror 15. Since the reverse surface of the half-mirror 15 is provided with anti-reflection coating, the light enters the substrate without being reflected at the reverse surface toward the user's eye. However, since the substrate is a linearly polarizing plate whose direction of polarization is perpendicular to that of the incident light, all the incident light is absorbed. Accordingly, there is produced no light that causes flare. Meantime, the light that is reflected toward the concave mirror 16 passes through the wave plate 23 twice during the round-trip travel to and from the concave mirror 16. At this time, a slight wavelength difference causes a large change in the condition of polarization. As a result, the light becomes practically nonpolarized light. Thus, the reflected light passes through the substrate of either of the half-mirrors 14 and 15. Therefore, the user can observe a clear image.

Figure 8:
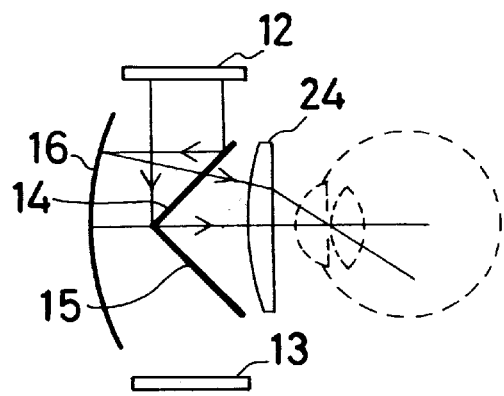
FIG. 8 shows an essential part of a fourth embodiment of the visual display apparatus according to the present invention.

Fourth Embodiment:

A fourth embodiment of the present invention will be explained with reference to FIG. 8. This embodiment is the same as the first embodiment except for some portions of the arrangement. Therefore, only the portions in which this embodiment differs from the first embodiment will be explained below. In the figure, reference numeral 24 denotes a convex lens. As illustrated, the angle of inclination of the chief ray that is reflected by the concave mirror 16 is further enlarged by refraction through the convex lens 24. That is, although the optical system of the first embodiment enables a wide field angle to be obtained without increasing the thickness in comparison to the conventional optical systems, the optical system of this embodiment enables the field angle to be further enlarged by disposing the convex lens 24 between the half-mirrors 14 and 15 on the one hand and the user's eyeball on the other. In addition, since the front focal point of the entire optical system is brought closer to the concave mirror 16 by the action of the convex lens 24, the positions of the two-dimensional display devices 12 and 13 can be brought closer to the half-mirrors 14 and 15. Thus, it is also possible to reduce the dimension of the optical system in the vertical direction as viewed in the figure. In addition, the Petzval sum of the concave mirror 16 and that of the convex lens 24 are opposite in sign to each other and hence act so as to cancel each other. Accordingly, the convex lens 24 also makes it possible to correct the field curvature in the entire optical system even more favorably.

Figure 9:
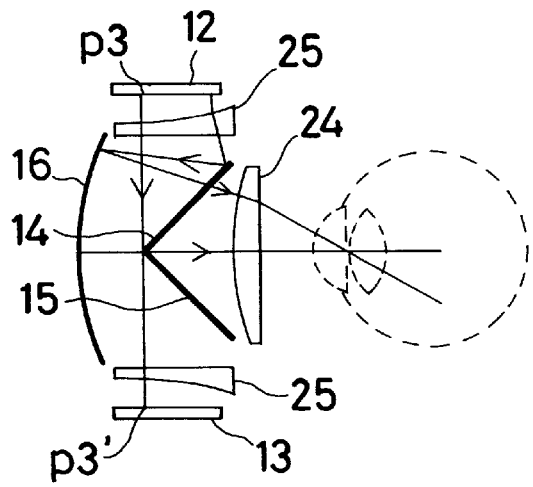
FIG. 9 shows an essential part of a fifth embodiment of the visual display apparatus according to the present invention.

Fifth Embodiment:

A fifth embodiment of the present invention will be explained with reference to FIG. 9. This embodiment is the same as the fourth embodiment except for some portions of the arrangement. Therefore, only the portions in which this embodiment differs from the fourth embodiment will be explained below. In the figure, reference numeral 25 denotes aspherical concave lenses which are decentered to a considerable extent. Although in the fourth embodiment the working distance is undesirably shortened by the convex lens 24, in this embodiment the concave lenses 25 are disposed in the vicinities of the two-dimensional display devices 12 and 13, that is, in the vicinities of the front focal point of the optical system shown in the fourth embodiment, thereby moving the back focal point away from the optical system without substantially changing the focal length of the entire optical system. Thus, the working distance can be increased without causing a substantial reduction in the field angle. It should be noted that the optical axes (axes of rotation) of the concave lenses 25 are coincident with the chief rays from the points p3 and p3' [see FIG. 4(*a*)]. It should also be noted that the aspherical concave lenses 25 function as a device for correcting pincushion distortion produced by the concave mirror 16 by the aspherical action. The concave lenses 25 have an aspherical configuration in which the curvature gradually increases as the distance from the optical axis increases.

Figure 10:
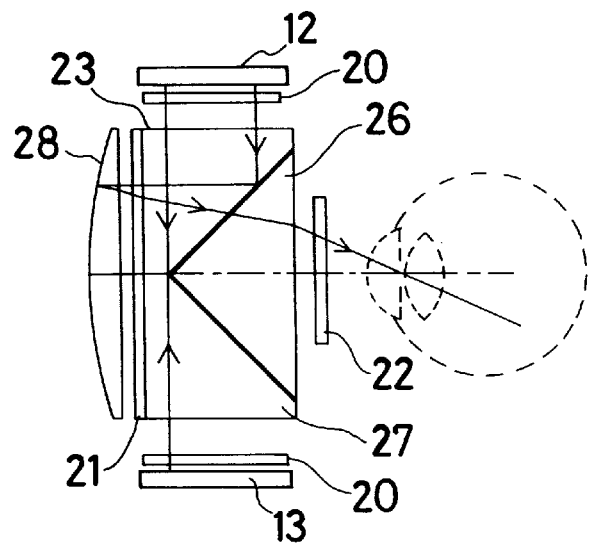
FIG. 10 shows an essential part of a sixth embodiment the visual display apparatus according to of the present invention.

Sixth Embodiment:

A sixth embodiment of the present invention will be explained with reference to FIG. 10. This embodiment is the same as the second embodiment except for some portions of the arrangement. Therefore, only the portions in which this embodiment differs from the second embodiment will be explained below. In the figure, reference numeral 26 denotes a triangular prism, 27 a V-shaped prism, and 28 is a concave mirror formed by mirror-coating the reverse surface of a convex lens. The triangular prism 26 and the V-shaped prism 27 are cemented together to form one prism as a whole. The cemented surface is provided with half-mirror coating so as to function in the same way as the half-mirrors 14 and 15 shown in the second embodiment. The concave mirror 28 is also adapted to project images of the two-dimensional display devices 12 and 13 in the air as enlarged images in the same way as the concave mirror 16 in the second embodiment. However, since the concave mirror 28 is formed by mirror-coating the reverse surface of a convex lens, the field curvature is smaller than in the case of the concave mirror 16 shown in the second embodiment. Thus, an even more favorable image can be obtained.

As illustrated in the figure, the greater part of the optical path between the concave mirror 28 and the user's eye is filled with the prism. This arrangement enables the front and back focal points of the concave mirror 28 to be brought away from each other, and the focal length of the concave mirror 28 can be shortened correspondingly. Accordingly, it is possible to increase the magnification ratio of the two-dimensional display devices 12 and 13 and hence obtain a wide field angle.

Figure 11:
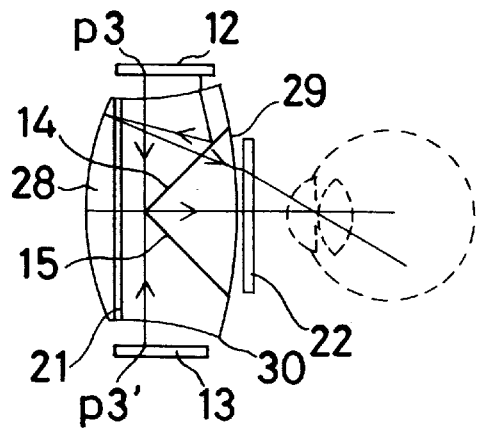
FIG. 11 shows an essential part of a seventh embodiment of the visual display apparatus according to the present invention.

Seventh Embodiment:

A seventh embodiment of the present invention will be explained with reference to FIG. 11. This embodiment is the same as the sixth embodiment except for some portions of the arrangement. Therefore, only the portions in which this embodiment differs from the sixth embodiment will be explained below. In the figure, reference numeral 29 denotes a triangular prism, and 30 a V-shaped prism. The triangular prism 29 and the V-shaped prism 30 are cemented together, and the cemented surface is provided with polarizing half-mirror coating. Accordingly, p-polarized light efficiently passes through the cemented surface, while s-polarized light is efficiently reflected by the cemented surface. The two-dimensional display devices 12 and 13 are TFT type LCDs (Liquid Crystal Display devices), each of which is illuminated by a backlight (not shown) from behind, and emits s-polarized light. The light is efficiently reflected by the above-described polarizing half-mirror coating portion, and reflected by the concave mirror 28 to enter the polarizing half-mirror coating portion again. During this travel, the light passes through the λ/4 plate 21 twice. Therefore, the light has changed to p-polarized light, and it efficiently passes through the polarizing half-mirror portion. Therefore, a brighter image can be observed. It should be noted that the entrance surfaces of the V-shaped prism 30 are formed as decentered concave surfaces so as to function as the decentered concave lenses 25 shown in the fifth embodiment, whereas the exit surface of the triangular prism 29 is formed as a convex surface so as to function as the convex lens 24 shown in the fifth embodiment.

Figure 12:
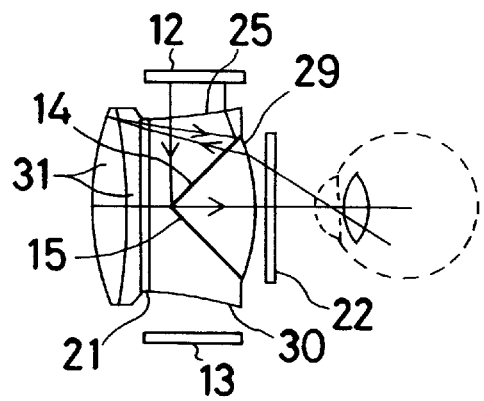
FIG. 12 shows an essential part of an eighth embodiment of the visual display apparatus according to the present invention.

Eighth Embodiment:

An eighth embodiment of the present invention will be explained with reference to FIG. 12. This embodiment is the same as the seventh embodiment except for some portions of the arrangement. Therefore, only the portions in which this embodiment differs from the seventh embodiment will be explained below. In the figure, reference numeral 31 denotes a concave mirror formed by cementing together a concave lens and a convex lens and mirror-coating the convex surface of the cemented lens. The prisms 29 and 30 are made of a material selected from among plastic and glass materials. These materials have color dispersion. Therefore, the optical path length for light of relatively short wavelength becomes shorter than that for light of relatively long wavelength. This causes chromatic aberration. In addition, chromatic aberration is also produced by the convex exit surface of the triangular prism 29. To correct the chromatic aberration, this embodiment uses the concave mirror 31, which is formed by cementing together a pair of concave and convex lenses having different dispersion characteristics from each other, in place of the concave mirror 28 in the seventh embodiment.

Figure 13:
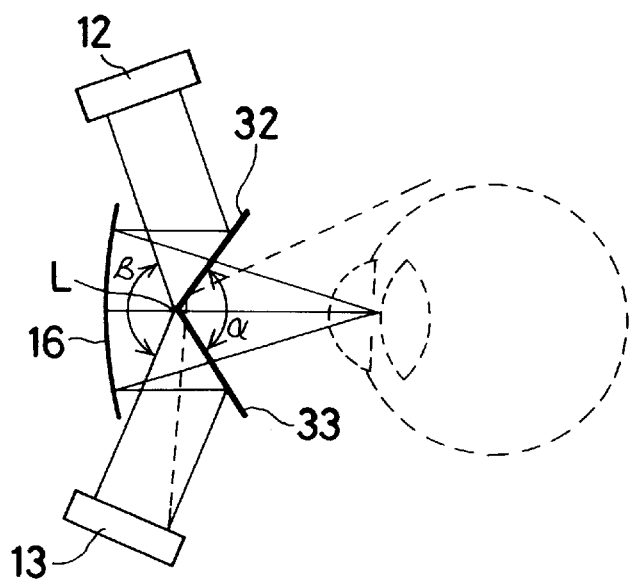
FIG. 13 shows an essential part of a ninth embodiment of the visual display apparatus according to the present invention.

Ninth Embodiment:

A ninth embodiment of the present invention will be explained with reference to FIG. 13. This embodiment is the same as the first embodiment except for some portions of the arrangement. Therefore, only the portions in which this embodiment differs from the first embodiment will be explained below. In the figure, reference numerals 32 and 33 denote half-mirrors which are each formed by using an ordinary optical glass as a substrate. The half-mirrors 32 and 33 are combined together in the shape of a V at an angle ($\alpha$) of 110° to each other. In the first embodiment, the corresponding points (e.g., p2 and p2'; p3 and p3'; and p4 and p4') on the two-dimensional display devices 12 and 13 lie in 180° positional relation to each other with respect to the edge L of the half-mirrors 32 and 33, whereas, in this embodiment, the corresponding points lie in 140° ($\beta=360°-2\alpha$) positional relation to each other with respect to the edge L. Thus, images that are divisionally displayed by the pair of two-dimensional display devices 12 and 13 are reflected by the half-mirrors 32 and 33 and combined together into one image.

In the first embodiment, louver type filters are used as the substrates of the half-mirrors 14 and 15 to eliminate light that causes flare. In this embodiment, however, since ordinary optical glass plates are used as the substrates, a part of the light emitted from the two-dimensional display devices 12 and 13 passes through the half-mirrors 32 and 33 as it is. However, since the half-mirrors 32 and 33 are combined not at right angles but at an obtuse angle ($\alpha=110°$), light that passes through the half-mirror 32 or 33 and that is reflected by the half-mirror 33 or 32 travels along an optical path which is off the user's pupil, as shown by the dotted line in the figure. Accordingly, such light causes no flare.

Tenth Embodiment:

A tenth embodiment of the present invention will be explained with reference to FIGS. 14(a) to 14(d), which are similar to FIGS. 1(a) to 1(d). This embodiment is the same as the second embodiment except for some portions of the arrangement. Therefore, only the portions in which this embodiment differs from the second embodiment will be explained below. In the second embodiment, the edge L of the half-mirrors 14 and 15 faces the concave mirror 16, whereas, in this embodiment the edge L faces in a direction opposite to that in the second embodiment, as shown in FIG. 14(a). Further, the half-mirrors 15 and 14 pair with the two-dimensional display devices 12 and 13, respectively. That is, light emitted from the two-dimensional display device 12 (13) passes through the half-mirror 14 (15) and is reflected by the half-mirror 15 (14) to form one composite image. The two-dimensional display devices 12 and 13 are adapted to display, respectively, the images that are displayed by the two-dimensional display devices 13 and 12 in the second embodiment. To produce a composite image shown in FIG. 14(d), for example, the two-dimensional display devices 12 and 13 are adapted to display an image 10' [FIG. 14(b)] and an image 11' [FIG. 14(c)], respectively. In this embodiment, even when the working distance is lengthened in comparison to the second embodiment, the overall height of the optical system can be made compact because the positions of the two-dimensional display devices 12 and 13 come closer to the half-mirrors 14 and 15.

It should be noted that if the concave mirror 16 in the first and other embodiments is a concave mirror provided with half-mirror coating, it is possible to observe an outside world image superimposed on the image displayed by the two-dimensional display devices 12 and 13. Even in a case where a convex lens is disposed immediately in front of the user's eye as in the fourth embodiment, an outside world image can be observed superimposed on the displayed image, provided that the concave mirror 16 is provided with half-mirror coating, and a concave lens of appropriate refractive power is disposed at the outside of the concave mirror 16.

Eleventh Embodiment:

An eleventh embodiment of the present invention will be explained with reference to FIG. 15. In the figure, reference numerals 38 and 39 denote totally reflecting mirrors, not half-mirrors, and 40 a convex lens. In this embodiment also, images of the two-dimensional display devices 12 and 13 are combined into one image by the mirrors 38 and 39 combined in the shape of a V in the same way as in the foregoing embodiments, and the composite image is projected in the air as an enlarged image by the convex lens 40. Accordingly, the display surface of each of the two-dimensional display devices 12 and 13 is disposed in the vicinity of the front focal point of the convex lens 40. Since in this embodiment the V-shaped optical system is formed from not half-mirrors but totally reflecting mirrors, the light utilization efficiency is favorably high, and it is therefore possible to observe a brighter image.

Figure 16:
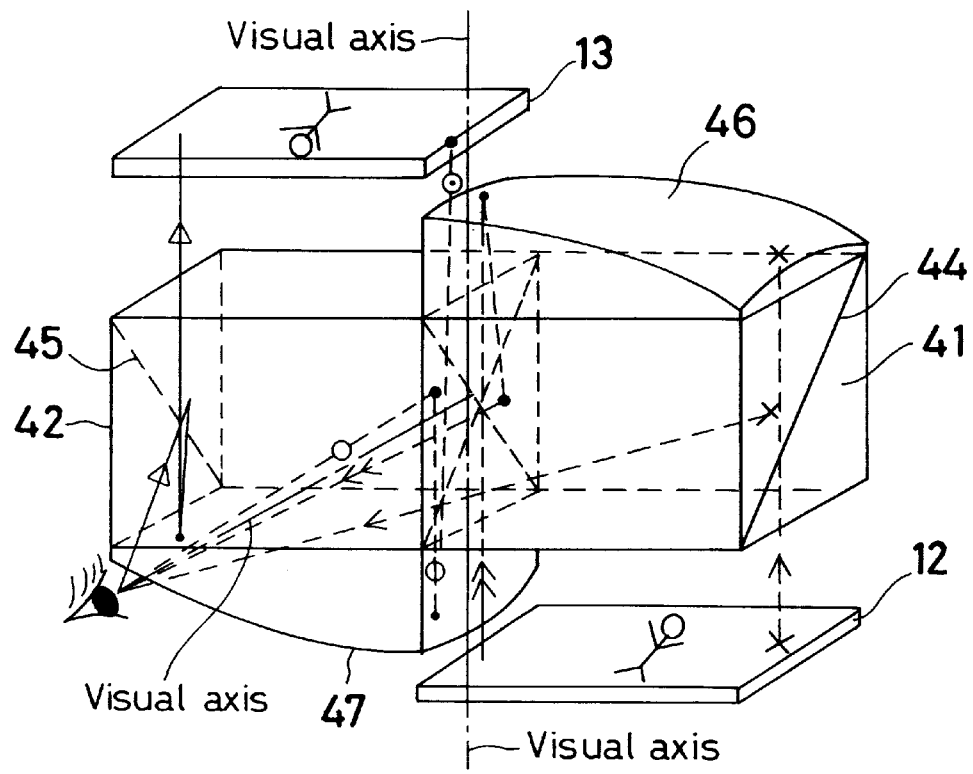
FIG. 16 is a perspective view showing an essential part of a twelfth embodiment of the visual display apparatus according to the present invention.

Twelfth Embodiment:

Next, an embodiment that uses two half-mirrors which are arranged in parallel in the shape of an X as viewed from a side thereof in place of the half-mirrors combined in a V-shaped will be explained with reference to the perspective view of FIG. 16. In the figure, two-dimensional display devices 12 and 13 are disposed so that their display surfaces face each other at respective positions which are offset from each other by a distance corresponding to the size of the display screen, and the display surfaces are approximately parallel to the user's visual axis. Beam splitter prisms 41 and 42 are arranged in parallel in the horizontal direction that intersects the user's visual axis. Half-mirrors 44 and 45 are disposed so that their reflecting surfaces lie at an angle of approximately 90° to each other and at an angle of approximately 45° to the user's visual axis. That is, the half-mirrors 44 and 45 are disposed in the shape of an X as viewed in the horizontal direction along the surfaces of the half-mirrors 44 and 45. In addition, concave mirrors 46 and 47 are disposed so as to face the two-dimensional display devices 12 and 13, respectively, across the user's visual axis. The concave mirrors 46 and 47 are each comprised of a decentered surface whose center axis is coincident with the visual axis that is bent at approximately 90° by the half-mirror 44 (45).

In the above-described arrangement also, an image displayed by the two-dimensional display device 12 passes through the half-mirror 44 and is reflected by the concave mirror 46 and then reflected by the half-mirror 44. An image displayed by the two-dimensional display device 13 passes through the half-mirror 45 and is reflected by the concave mirror 47 and then reflected by the half-mirror 45. In this way, the divisionally displayed images are optically combined into one continuous image. Thus, the user can observe a seamless image. The concave mirrors 46 and 47 are decentered so that the exit pupils formed by the light rays from the pair of two-dimensional display devices 12 and 13 coincide with each other. It should be noted that images which are displayed by the two-dimensional display devices 12 and 13 are in upside-down relation to each other.

The arrangement may be such that polarizing beam splitter prisms are used as the beam splitter prisms 41 and 42, and λ/4 plates 21 are disposed between the beam splitter prisms 41 and 42 and the concave mirrors 46 and 47, respectively, as in the sixth embodiment. The concave mirrors 46 and 47 may be integrated with the prisms 41 and 42, respectively. Alternatively, the concave mirrors 46 and 47 may be formed as members separate from the prisms 41 and 42. In addition, the prisms 41 and 42 may be disposed in parallel not in the horizontal direction but in the vertical direction. In this case, a wide field angle can be obtained in the vertical direction. It should be noted that in this embodiment an outside world image can be readily observed superimposed on the image displayed by the two-dimensional display devices 12 and 13 by using a transparent surface as the front surface of each of the prisms 41 and 42.

Figure 17:
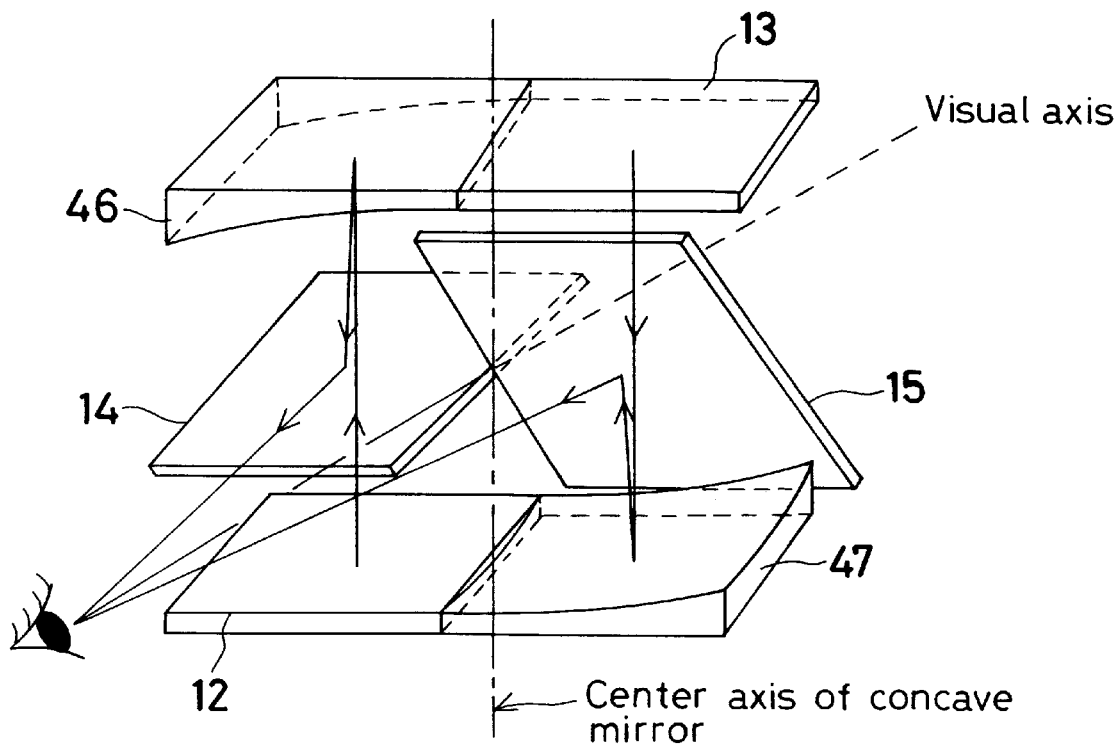
FIG. 17 is a perspective view showing an essential part of a thirteenth embodiment of the visual display apparatus according to the present invention.

Thirteenth Embodiment:

A thirteenth embodiment of the present invention will be explained with reference to the perspective view of FIG. 17. This embodiment is basically the same as the twelfth embodiment. In this embodiment, however, half-mirrors 14 and 15 are used in place of the beam splitter prisms 44 and 45. Since no prism is used in this embodiment, the weight of the apparatus is relatively light. In addition, since there is no surface having power with respect to light coming from the outside world along the visual axis, an outside world image can be seen as a life-size, natural image. Further, since there is only one semitransparent surface inserted with respect to light from the outside world, a brighter see-through image can be obtained.

Figure 18:
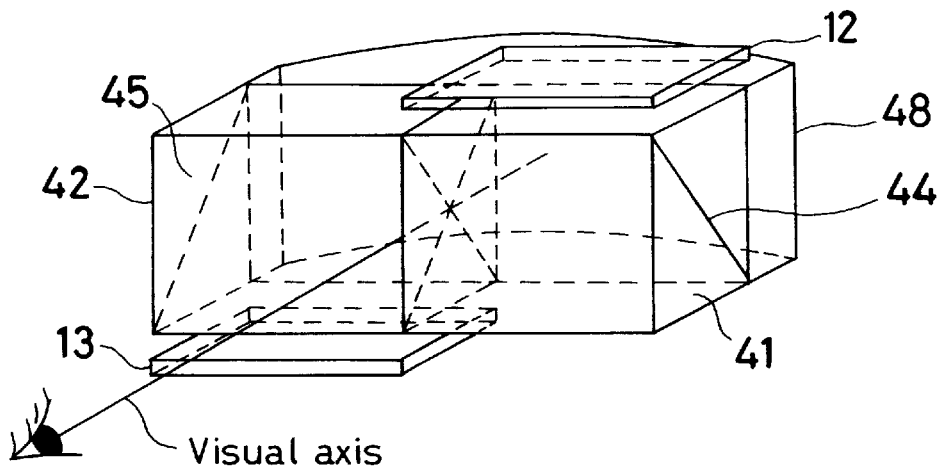
FIG. 18 is a perspective view showing an essential part of a fourteenth embodiment of the visual display apparatus according to the present invention.

Fourteenth Embodiment:

A fourteenth embodiment of the present invention will be explained with reference to the perspective view of FIG. 18. This embodiment is a modification of the twelfth embodiment. In this embodiment, a single concave mirror 48 whose center axis is coincident with the user's visual axis is used in place of the two decentered concave mirrors in the twelfth embodiment. More specifically, referring to FIG. 18, two-dimensional display devices 12 and 13 are disposed so that their display surfaces face each other at respective positions which are offset from each other by a distance corresponding to the size of the display screen, and the display surfaces are approximately parallel to the user's visual axis. Beam splitter prisms 41 and 42 are arranged in parallel in the horizontal direction that intersects the user's visual axis. Half-mirrors 44 and 45 are disposed so that their reflecting surfaces lie at an angle of approximately 90° to each other and at an angle of approximately 45° to the user's visual axis. Moreover, a concave mirror 48 is disposed forwardly of the prisms 41 and 42 as viewed in the direction of the visual axis.

In the above-described arrangement, an image displayed by the two-dimensional display device 12 is reflected forwardly by the half-mirror 44, reflected by the concave mirror 48 and then passes through the half-mirror 44. An image displayed by the two-dimensional display device 13 is reflected forwardly by the half-mirror 45, reflected by the concave mirror 48 and then passes through the half-mirror 45. In this way, the divisionally displayed images are optically combined into one continuous image. Thus, the user can observe a seamless image. In this case also, images which are displayed by the two-dimensional display devices 12 and 13 are in upside-down relation to each other.

In this embodiment, an outside world image cannot be observed superimposed on the image displayed by the two-dimensional display devices 12 and 13 unless a semitransparent mirror is used as the concave mirror 48. It should be noted that in this case the number of parts required is smaller than that in the twelfth embodiment. Therefore, the manufacturing process is facilitated.

Fifteenth Embodiment:

Incidentally, in the foregoing embodiments the planar wave plates 21 and 23 are disposed between the concave mirrors 16, 28 or 31 and the half-mirrors 14 and 15 or the prisms 27, 30, or 41 and 42 for the purpose of preventing occurrence of flare. By replacing the wave plates 21 and 23 with wave plates 21' and 23' which are curved in conformity to the curvature of the concave mirror 16, the overall size of the apparatus can be reduced.

Figure 19A:
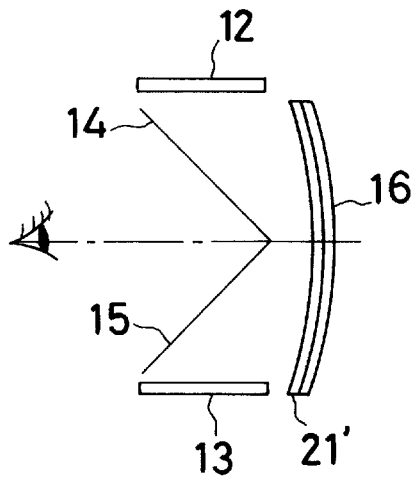
FIGS. 19(a), 19(b) and 19(c) show essential parts of some forms, respectively, of a fifteenth embodiment of the visual display apparatus according to the present invention.
Figure 19B:
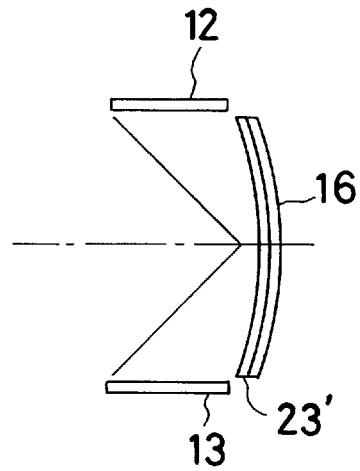
Figure 19C:
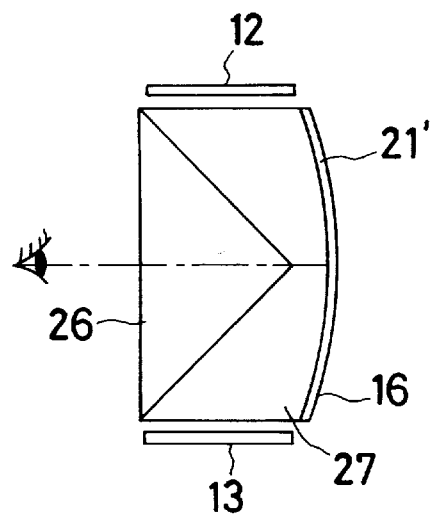

FIG. 19(*a*) is a view showing an example corresponding to the second and tenth embodiments, in which illustration of the polarizer 20 and other constituent elements is omitted. As illustrated in the figure, a λ/4 plate 21' is curved in conformity to the curvature of the concave mirror 16 and brought into close contact with the mirror 16, thereby enabling the overall thickness of the apparatus to be reduced by an amount corresponding to the spherical segment of the concave mirror 16.

FIG. 19(*b*) shows an example corresponding to the third embodiment. In this case, a rock crystal wave plate 23' is similarly curved and brought into close contact with the concave mirror 16, thereby enabling the overall thickness of the apparatus to be reduced by an amount corresponding to the spherical segment of the concave mirror 16.

FIG. 19(*c*) shows an example corresponding to the sixth to eighth embodiments. In these embodiments, the optical path is filled with a prism and a lens in order to shorten the optical path. In the illustrated example, however, the concave mirror 16 and the λ/4 plate 21' are integrated into one unit. Therefore, there is no need for a lens having the concave mirror 16 as a reverse mirror, and it is only necessary to transform the surface of each of the prisms 27, 30, 41 and 42. Thus, the arrangement is even more simplified, and the number of parts required is reduced.

Figure 20:
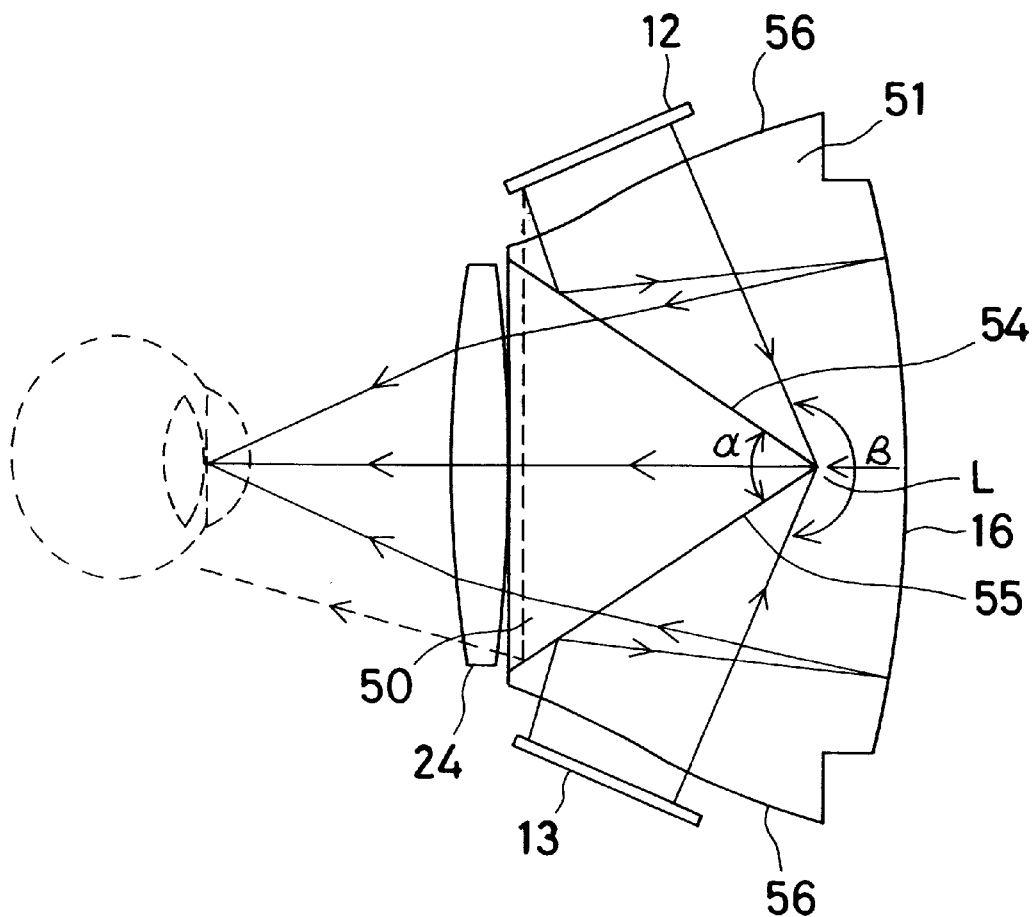
FIG. 20 shows an essential part of a sixteenth embodiment of the visual display apparatus according to the present invention.
Figure 21A:
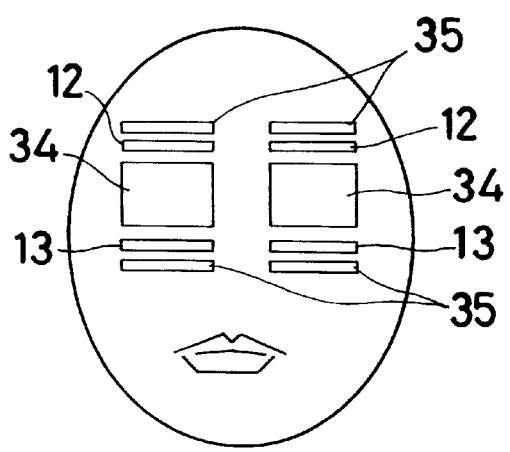
FIG. 21(a) shows an essential part of a visual display apparatus in which constituent elements are arranged vertically.
Figure 21B:
FIGS. 21(b), 21(c) and 21(d) show images displayed by the visual display apparatus shown in FIG. 21(a) and a composite image obtained with the visual display apparatus.
Figure 21C:
Figure 21D:
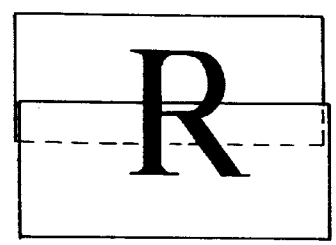

Sixteenth Embodiment:

A sixteenth embodiment of the present invention will be explained with reference to FIG. 20. This embodiment is the same as the fifth and ninth embodiments except for some portions of the arrangement. Therefore, only the portions in which this embodiment differs from the fifth and ninth embodiments will be explained below. In the figure, reference numeral 50 denotes a 66° prism, 51 a V-shaped prism, and 16 a mirror-coated concave mirror. The 66° prism 50 and the V-shaped prism 51 are cemented together to form one prism as a whole, and the cemented surfaces 54 and 55 are each provided with half-mirror coating in the same way as in the sixth embodiment. The half-mirror coated cemented surfaces 54 and 55 lie in a V shape at an angle (α) of 66° to each other. The corresponding points on the two-dimensional display devices 12 and 13 are in 228° (β) positional relation to each other with respect to the edge L. Since the half-mirror coated cemented surfaces 54 and 55 are combined together not at right angles but at an acute angle (α=66°). light that passes through the half-mirror 54 or 55 and that is reflected by the following half-mirror 55 or 54 travels along an optical path which is off the user's pupil, as shown by the dotted line. Accordingly, such light causes no flare.

Further, in this embodiment, such convex aspherical surfaces 56 that the curvature gradually decreases as the distance from the optical axis increases are provided on side surfaces of the V-shaped prism 51, thereby correcting pincushion distortion that is produced by the concave mirror 16.

Incidentally, when the optical system described in each of the foregoing embodiments is to be prepared for each of the user's left and right eyes, either of two different methods may be adopted: one in which the two-dimensional display devices 12 and 13 are disposed to face each other vertically across the optical system for each eye, as shown in FIG. 21(*a*), and another in which the two-dimensional display devices 12 and 13 are disposed to face each other horizontally across the optical system for each eye, as shown in FIG. 22(*a*). It should be noted that in FIGS. 21(*a*) and 22(*a*), reference numeral 34 denotes the whole optical system for each eye, and 35 and 36 denote backlights. FIGS. 21(*b*) and 22(*b*) show examples of images displayed on the two-dimensional display device 12, and FIGS. 21(*c*) and 22(*c*) show examples of images displayed on the two-dimensional display device 13. FIGS. 21(*d*) and 22(*d*) show composite images obtained by combining the images displayed on the two-dimensional display devices 12 and 13.

In the method wherein the two-dimensional display devices 12 and 13 are vertically arranged, as shown in FIG. 21(*a*), the images are vertically combined together, and it is therefore possible to use display devices having a relatively short vertical dimension, as shown in FIGS. 21(*b*) and 21(*c*), [i.e., a relatively short depth in FIG. 21(*a*)], as the two-dimensional display devices 12 and 13. Accordingly, the overall thickness of the apparatus is effectively reduced. In the method wherein the two-dimensional display devices 12 and 13 are horizontally arranged across the optical system 34, as shown in FIG. 22(*a*), when the two-dimensional display devices 12 and 13 must be illuminated from behind them, two two-dimensional display devices 12 and 13 can be simultaneously illuminated with a single light source [i.e., the backlight 36 in FIG. 22(*a*) simultaneously illuminates the two-dimensional display devices 12 and 13 which lie on the left and right sides thereof]. It should be noted that the arrangement shown in FIG. 22(*a*) enables the field angle to be widened in the horizontal direction, and it is even more natural.

Figure 23A:
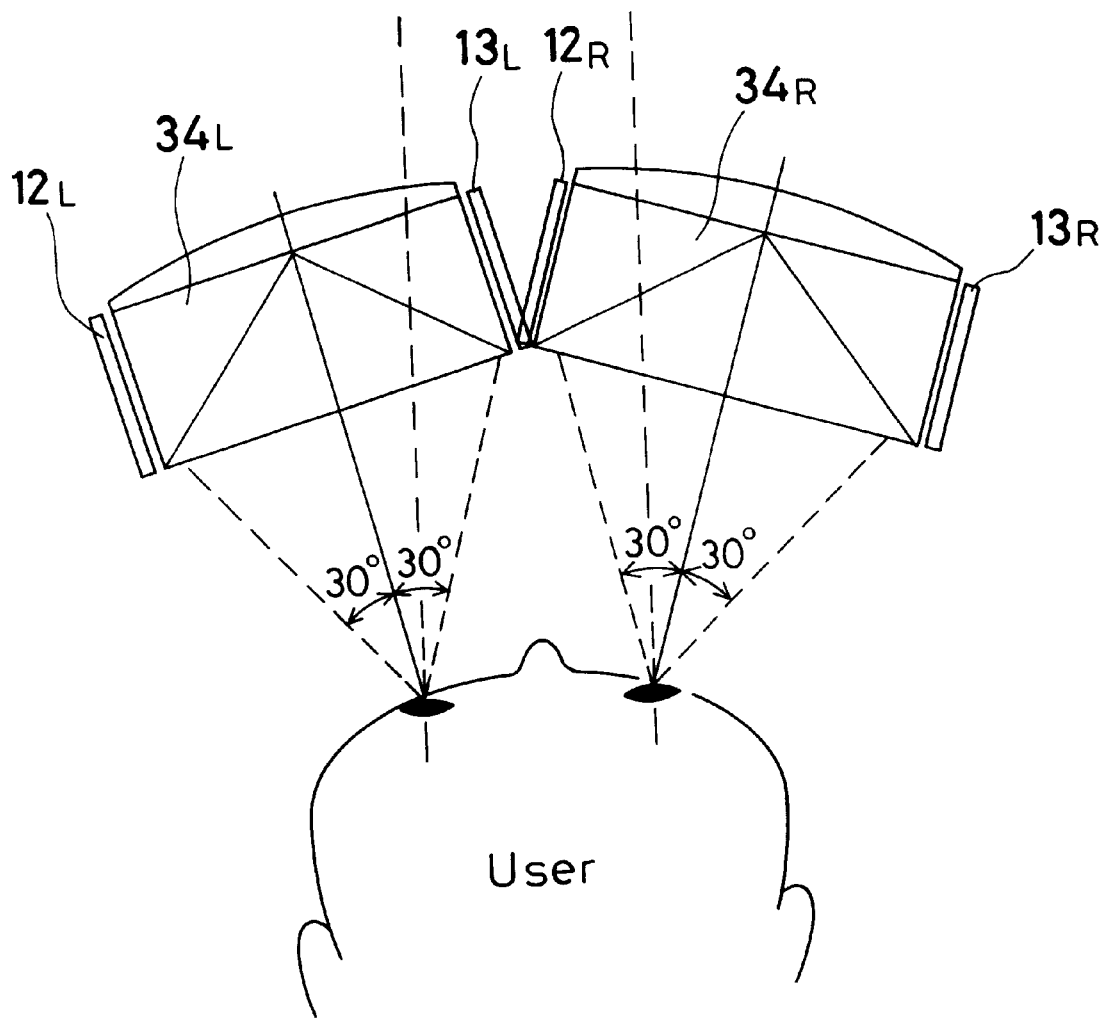
FIG. 23(a) shows an essential part of a modification of the horizontally arranged visual display apparatus.
Figure 23B:
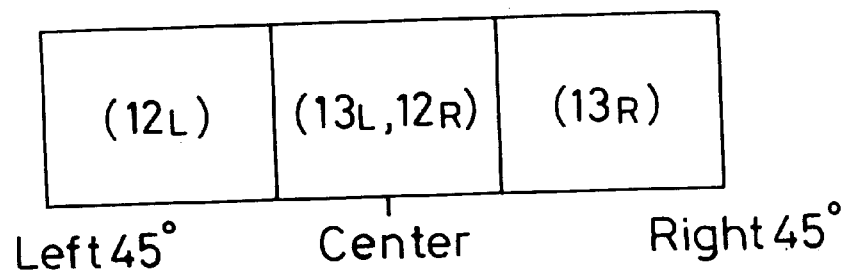
FIG. 23(b) shows a composite display screen in the modification shown in FIG. 23(a).

Incidentally, when the left and right optical systems 34 are arranged horizontally, as shown in FIG. 22(*a*), the left and right optical systems $34_L$ and $34_R$ may be arranged as shown in the plan view of FIG. 23(*a*). That is, the left and right optical systems $34_L$ and $34_R$ need not necessarily be arranged in a straight line but may be arranged at a tilt in the shape of "∧" so that the optical axes of light emitted from the optical systems $34_L$ and $34_R$ enter the user's left and right eyes, respectively, slightly inwardly from the left and right sides. In the arrangement shown in FIG. 23(*a*), the optical system $34_L$ for the left eye has a two-dimensional display device $12_L$ for displaying a left-hand image and a two-dimensional display device $13_L$ for displaying a right-hand image, while the optical system $34_R$ for the right eye has a two-dimensional display device $12_R$ for displaying a left-hand image and a two-dimensional display device $13_R$ for displaying a right-hand image. In this embodiment, each pair of two-dimensional display devices $12_L$ and $13_L$, and $12_R$ and $13_R$ are arranged so that each display device displays an image defined at an angle of 30°. If the same image is displayed on the two-dimensional display devices $13_L$ and $12_R$, the images displayed by the two-dimensional display devices $13_L$ and $12_R$ are superimposed on one another in the center of the entire display screen of the apparatus, as shown in FIG. 23(*b*), and the image displayed by the two-dimensional display device $12_L$ lies on the left-hand side of the central display image, while the image displayed by the two-dimensional display device $13_R$ lies on the right-hand side of the central display image. Thus, it is possible to obtain a wide field angle of ±45° for each of the left and right sides. It should be noted that if the two-dimensional display devices 13$_L$ and 12$_R$ are arranged to display the same image, the electronic circuit is simplified. Stereoscopic display of horizontal field angle 90° can also be effected by displaying images having a parallax on the two-dimensional display devices 13$_L$ and 12$_R$.

Figure 24:
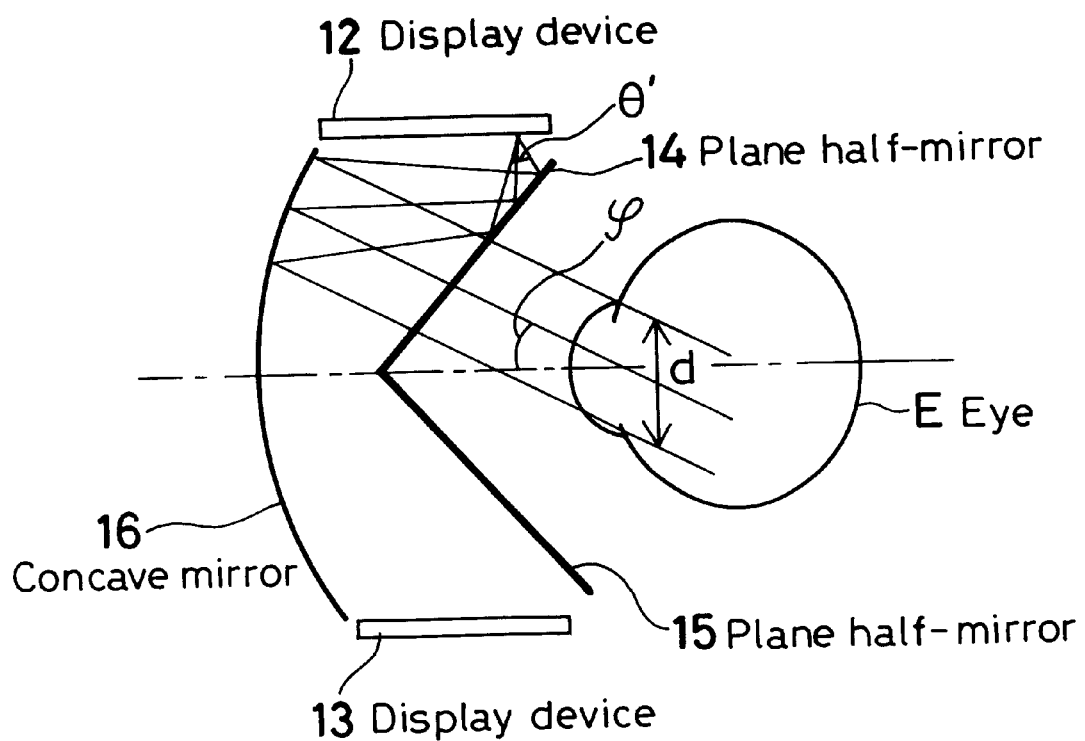
FIG. 24 is a sectional view of a typical optical system in the visual display apparatuses of the first to sixteenth embodiments.
Figure 25:
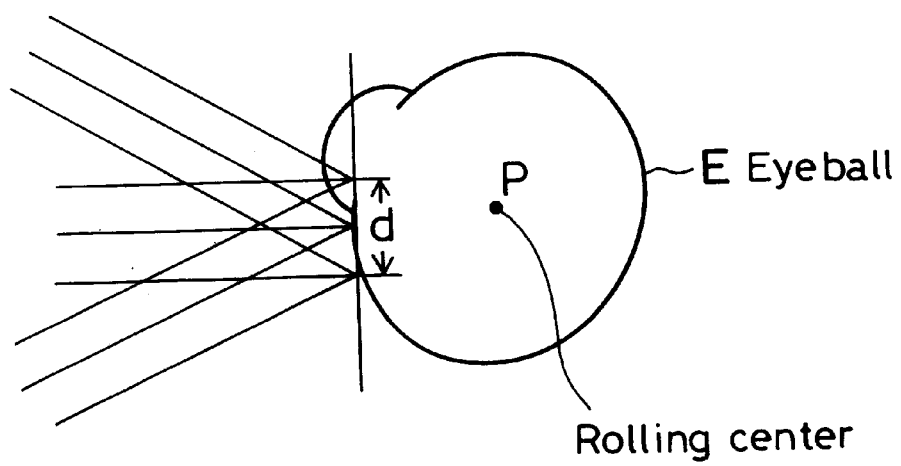
FIG. 25 is a view for explanation of a problem arising when the exit pupil diameter of a visual display apparatus is small as in the case of the optical system shown in FIG. 24.

Among important parameters of a visual display apparatus such as those described in the foregoing embodiments is exit pupil diameter d as shown in FIG. 24. If the exit pupil diameter d is not sufficiently large, when the eyeball E rotates about the rolling center P, as shown in FIG. 25, no light passes through the pupil, so that no image can be seen.

In the optical system shown in FIG. 24, the pupil diameter d is determined by the size of the concave mirror 16. Among the bundles of rays emitted from the display devices 12 and 13, a part of the light rays are eclipsed by the concave mirror 16. Accordingly, the effective emergence angle θ' of light from the display devices 12 and 13 is limited by the size of the concave mirror 16. In addition, in order to increase the angle φ in the optical system shown in FIG. 24, the curvature radius of the concave mirror 16 must be reduced. However, if the curvature radius is reduced, the focal length of the concave mirror 16 is shortened, so that the display devices 12 and 13 must be brought closer to the concave mirror 16. However, since the display devices 12 and 13 would interfere with the concave mirror 16 and the plane half-mirrors 14 and 15, they cannot be brought closer to the concave mirror 16.

The following is a description of seventeenth to twenty-first embodiments in which the present invention is embodied in another form to solve the above-described problem.

Figure 26:
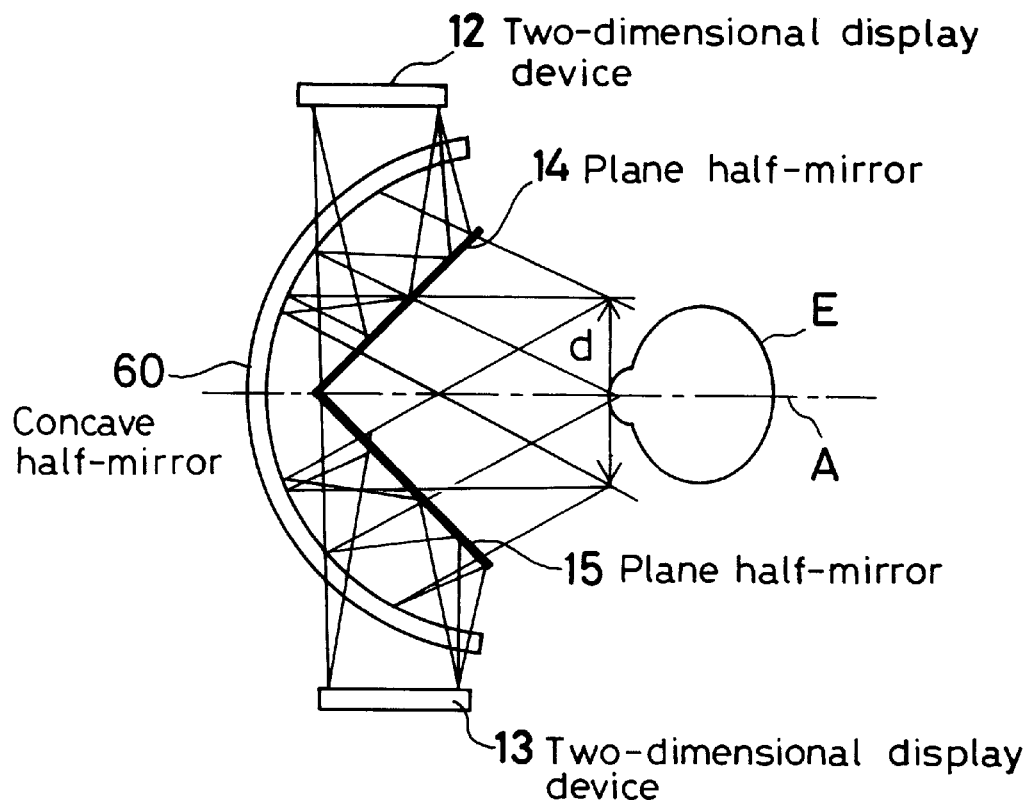
FIG. 26 is a sectional view of an optical system of a seventeenth embodiment of the visual display apparatus according to the present invention.

Seventeenth Embodiment:

FIG. 26 is a sectional view showing the optical system of the seventeenth embodiment. In this embodiment, two-dimensional display devices 12 and 13, e.g., LCDs (Liquid Crystal Display devices), are disposed to face each other. A concave half-mirror 60 is disposed in coaxial relation to an outside world optical axis A, which is the axis of symmetry of the two-dimensional display devices 12 and 13. Two plane half-mirrors 14 and 15 are arranged in the shape of a V so that the plane half-mirror 14 faces the two-dimensional display device 12 across one end of the concave half-mirror 60, and the plane half-mirror 15 faces the two-dimensional display device 13 across the other end of the concave half-mirror 60. Light from the display device 12 (13) passes through one end of the concave half-mirror 60 and is reflected by the half-mirror 14 (15). Thereafter, the reflected light is reflected by the concave half-mirror 60 and then passes through the half-mirror 14 (15) to enter the eye E.

Figure 27A:
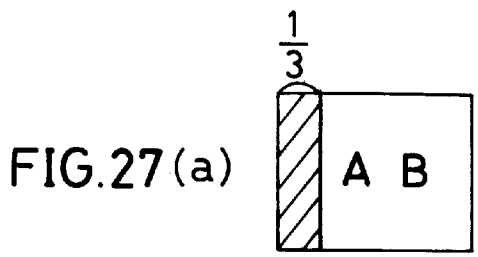
FIGS. 27(a) and 27(b) show images displayed by display devices, respectively.
Figure 27B:
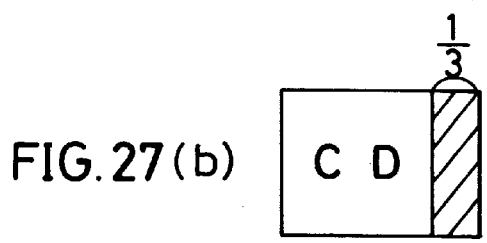
Figure 27C:
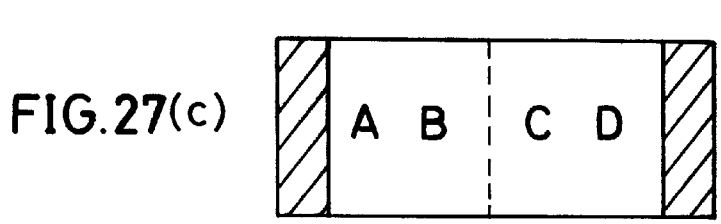
FIG. 27(c) shows a composite image obtained by horizontally connecting together the display images shown in FIGS. 27(a) and 27(b).

In the above-described arrangement, if "AB" is displayed on the display device 12, as shown in FIG. 27(a), and "CD" is displayed on the display device 13, as shown in FIG. 27(b), these two images are combined together into one image "ABCD", as shown in FIG. 27(c), by the half-mirrors 14 and 15 arranged in the shape of a V. The resulting image is enlarged by the concave half-mirror 60 for observation.

When the two images are connected horizontally as described above, it is possible to display a wide-vision image which is long from side to side. When display devices 12 and 13 in which the ratio of height to width of the display screen is 3:4 are used, if an image is displayed by using only ⅔ of each of the display devices 12 and 13 from one end thereof and connecting the two images horizontally as described above, it is possible to provide an image according to the high-vision standards, which has a height-to-width ratio of 9:16 [see FIG. 27(c)].

Figure 28A:
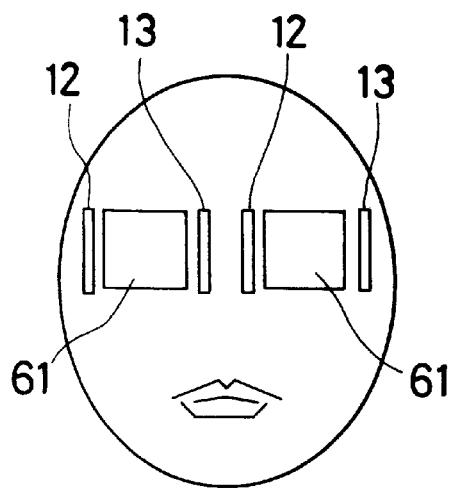
FIG. 28(a) shows the arrangement of a display apparatus designed for two eyes in a case where images displayed by display devices are connected together horizontally.
Figure 28B:
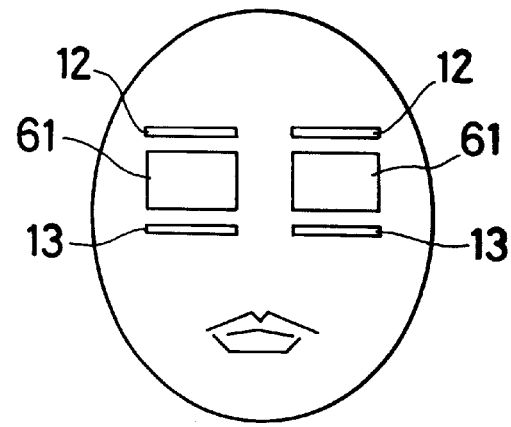
FIG. 28(b) shows the arrangement of a display apparatus designed for two eyes in a case where images displayed by display devices are connected together vertically.
Figure 29A:
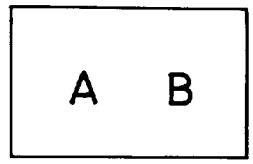
FIGS. 29(a) and 29(b) show images displayed by display devices, respectively.
Figure 29B:
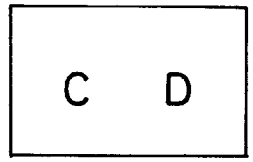
Figure 29C:
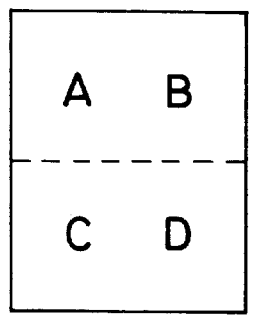
FIG. 29(c) shows a composite image obtained by vertically connecting together the display images shown in FIGS. 29(a) and 29(b).

In a case where two images are connected horizontally as shown in FIG. 27(c), the display devices 12 and 13 are disposed on the left and right sides, respectively, of each eyeball, as shown in FIG. 28(a). In a case where two images such as those shown in FIGS. 29(a) and 29(b) are connected vertically, the display devices 12 and 13 are disposed on the upper and lower sides, respectively, of each eyeball, as shown in FIG. 28(b). It should be noted that reference numeral 61 in FIGS. 28(a) and 28(b) denotes ocular optical systems each composed of a concave half-mirror 60 and plane half-mirrors 14 and 15 which are arranged in the shape of a V. Further, the outside world can be seen through the concave half-mirror 60 and the plane half-mirrors 14 and 15. In FIG. 26, reference symbol A denotes an outside world optical axis, which intersects perpendicularly to the optical axes of the display devices 12 and 13.

It should be noted that if rays of light emitted from the display devices 12 and 13 pass through the plane half-mirrors 14 and 15 and are reflected by these half-mirrors, the reflected light rays travel toward the user's eye E, causing flare (ghost light). Therefore, such light must be cut off somewhere. Accordingly, the half-mirrors 14 and 15 are each produced by providing half-mirror coating 19 on the surface of a louver type filter substrate [see FIGS. 5(a) and 5(b)].

Figure 30:
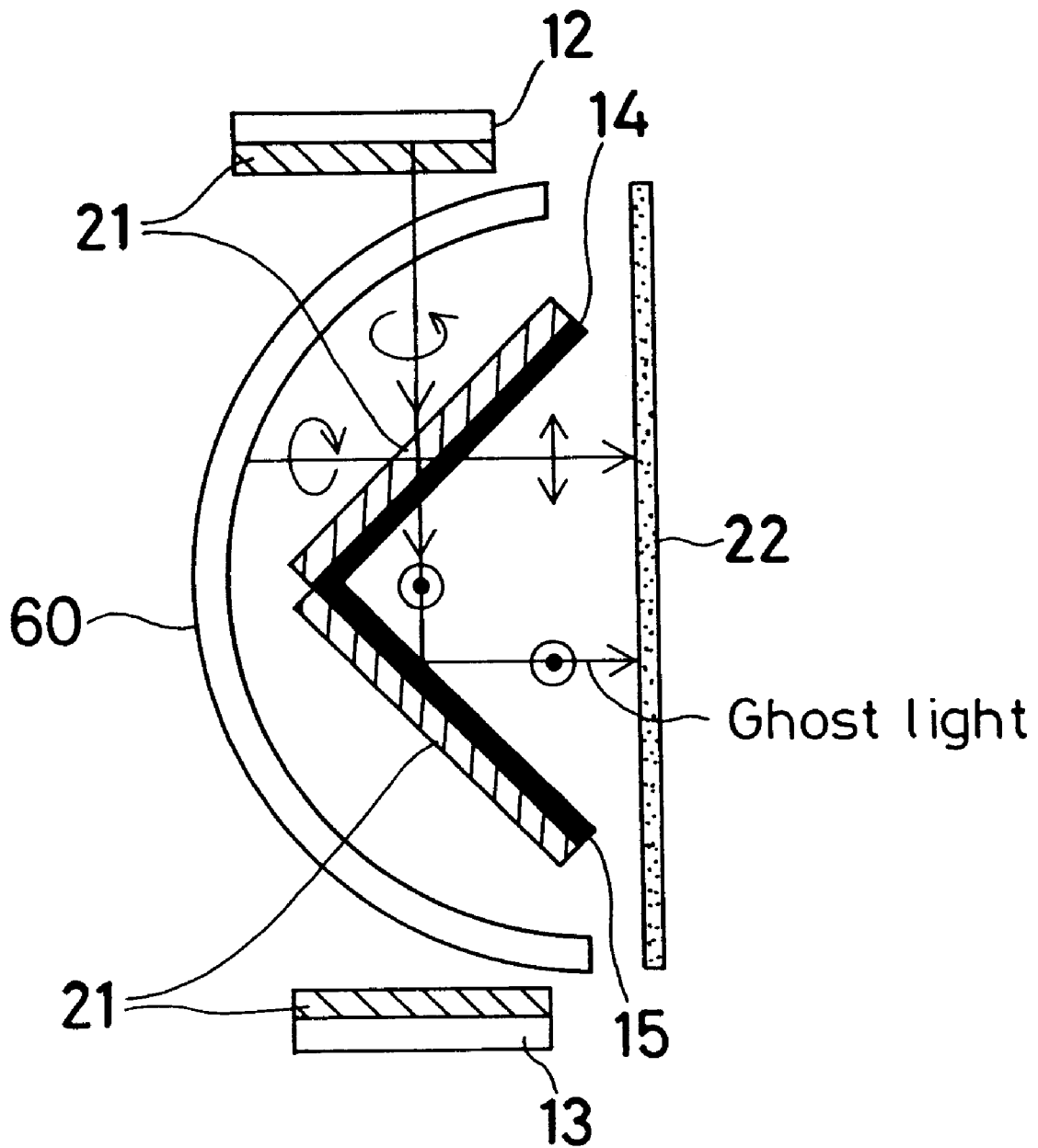
FIG. 30 shows one example of an arrangement that uses quarter-wave plates and a polarizing plate for eliminating flare.

There is another flare eliminating method that uses quarter-wave plates and a polarizing plate. FIG. 30 shows an example of an arrangement that employs this method. Quarter-wave plates 21 are disposed between the display devices 12 and 13 on the one hand and the concave half-mirror 60 on the other and between the concave half-mirror 60 and the plane half-mirrors 14 and 15. A polarizing plate 22 is disposed between the plane half-mirrors 14 and 15 on the one hand and the eye E on the other.

As the display devices 12 and 13, LCDs that emit linearly polarized light or CRTs with a polarizing plate are used. First, linearly polarized light (p-polarized light) from the display device 12 (13) passes through the quarter-wave plate 21 between the display device 12 (13) and the concave half-mirror 60 to become counterclockwise circularly polarized light, which then passes through the quarter-wave plate 21 twice, which is disposed in front of the plane half-mirror 14 (15), during the round-trip travel to and from the plane half-mirror 14 (15) to become clockwise circularly polarized light. After being reflected by the concave half-mirror 60, the light passes through the quarter-wave plate 21 in front of the plane half-mirror 14 (15) to return to p-polarized light. If the polarizing plate 22 is disposed in such a direction that p-polarized light passes through it, the p-polarized light passes through the polarizing plate 22 and enters the eye E to display the image. Meantime, light that directly passes through one plane half-mirror 14 or 15 becomes s-polarized light. Therefore, if this light is reflected by the other plane half-mirror 15 or 14, it remains in the state of s-polarized light and cannot pass through the polarizing plate 22. Accordingly, no ghost image is seen.

Figure 31:
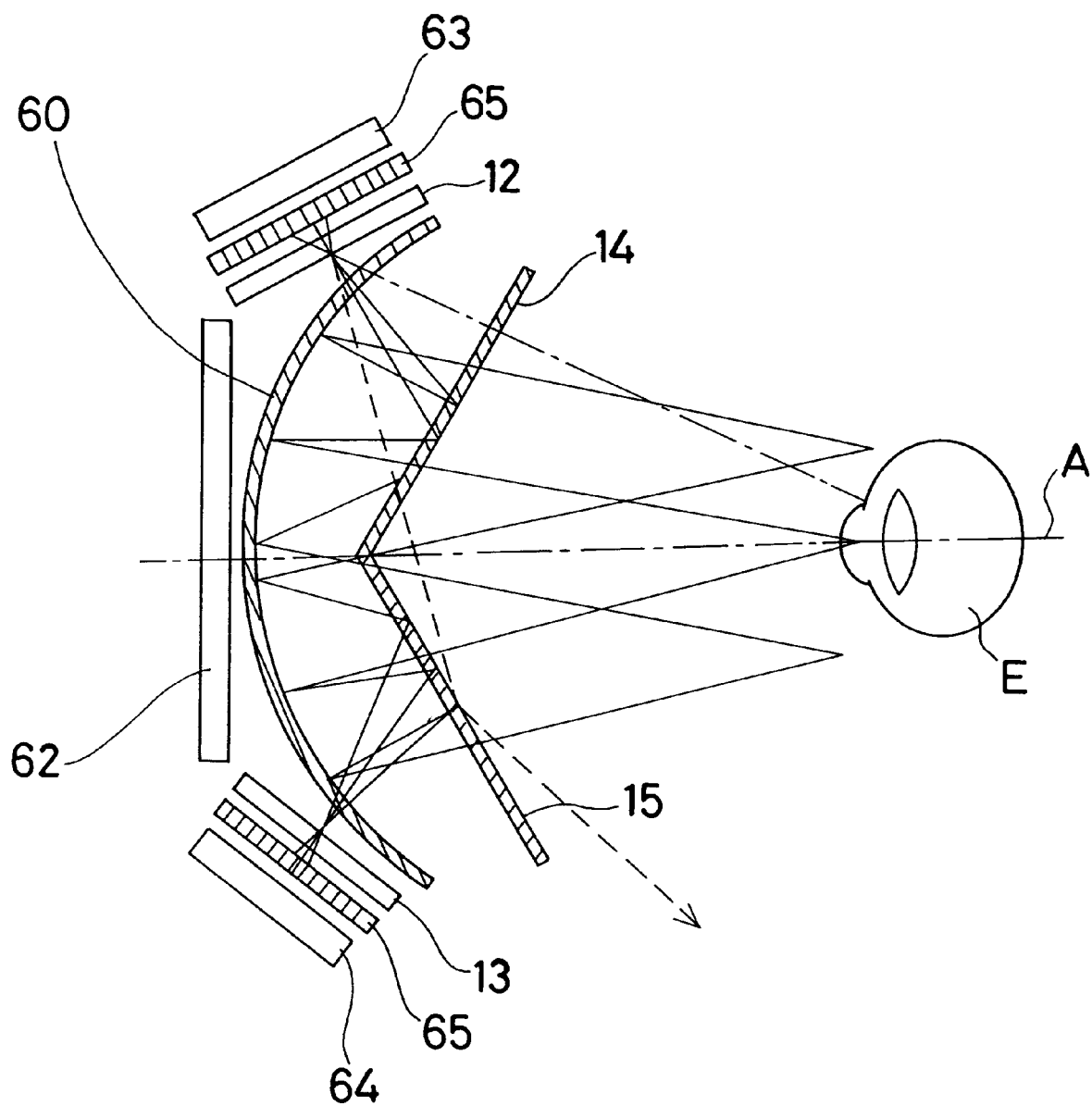
FIG. 31 is a sectional view of an optical system in an eighteenth embodiment of the visual display apparatus according to the present invention.

Eighteenth Embodiment:

In this embodiment, the plane half-mirrors 14 and 15 are combined together in the shape of a V at an obtuse angle to each other, that is, an angle larger than that in the foregoing embodiments. As shown in FIG. 31, if the intersectional angle between the plane half-mirrors 14 and 15 arranged in a V shape is an obtuse angle, light that passes through the plane half-mirror 14, as shown by the dotted line in the figure, is incident on the other plane half-mirror 15 at a relatively large angle. Therefore, the reflected light does not travel toward the eye E. Accordingly, ghost light is minimized. In addition, in order to eliminate light from the LCD 12 or 13 that would pass through the plane half-mirror 14 or 15 and travel directly toward the eye E (as shown by the dot-dash line in the figure), a louver 65 is disposed between the LCD 12 (13) and the backlight 63 (64) to limit the numerical aperture (NA) of the bundle of rays from the LCD 12 (13). In addition, a liquid crystal shutter 62 is disposed on the side of the concave half-mirror 60 which is remote from the eye E at a position approximately middle between the LCDs 12 and 13. When the liquid crystal shutter 62 is open, light from the outside world passes through the concave half-mirror 60 and the plane half-mirrors 14 and 15 and enters the eye E. Accordingly, the user can observe the outside world. In this embodiment, the optical axes of the LCDs 12 and 13 are not perpendicular to the outside world optical axis A.

Figure 32:
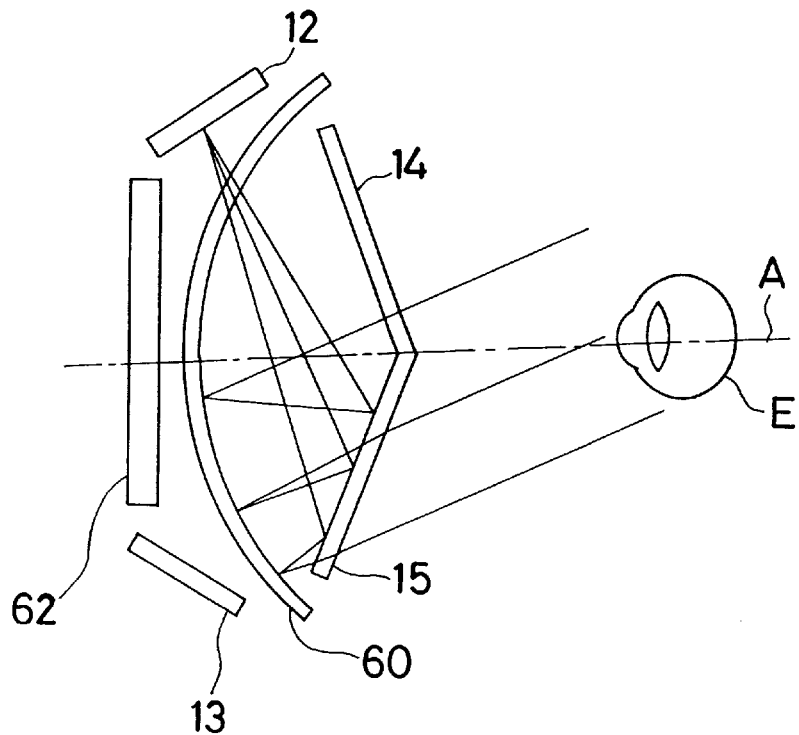
FIG. 32 is a sectional view of an optical system in a nineteenth embodiment of the visual display apparatus according to the present invention.

Nineteenth Embodiment:

FIG. 32 shows the optical system of a nineteenth embodiment of the present invention. In this embodiment, the plane half-mirrors 14 and 15 that are arranged in a V shape at an obtuse angle to each other in the eighteenth embodiment are disposed to face in the opposite direction to that in the eighteenth embodiment. Display light that is emitted from one two-dimensional display device 12 or 13 passes through one end of the concave half-mirror 60 and is reflected by the plane half-mirror 15 or 14 on the opposite side. Thereafter, the reflected light is reflected by the concave half-mirror 60 and then passes through the plane half-mirrors 14 and 15 to enter the eye E. In this embodiment, no flare is produced, and the pupil diameter is large. In addition, the eye relief (eye point) becomes advantageously long.

Figure 33:
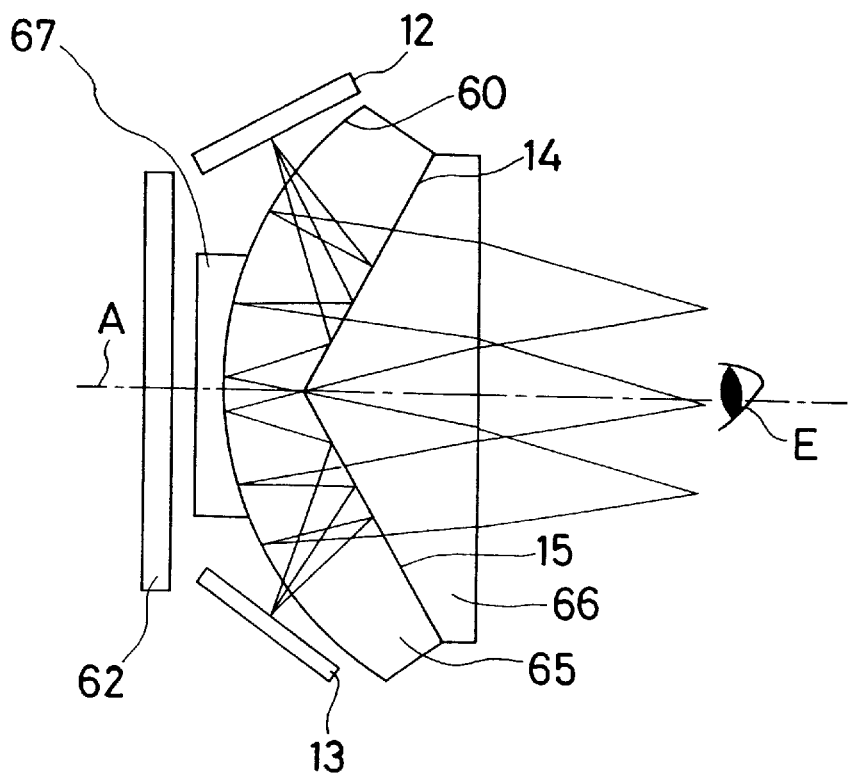
FIG. 33 is a sectional view of an optical system in a twentieth embodiment of the visual display apparatus according to the present invention.

Twentieth Embodiment:

FIG. 33 shows the optical system of a twentieth embodiment of the present invention. In this embodiment, half-mirror coating is provided on both the obverse and reverse surfaces of a transparent optical member 65, thereby forming plane half-mirrors 14 and 15 and a concave half-mirror 60 in the optical arrangement in the foregoing embodiments. In addition, a transparent member 66 having the same refractive index as that of the transparent optical member 65 is cemented to the plane half-mirror side of the transparent optical member 65, thereby preventing occurrence of a prism action at the half-mirror coated surfaces 14 and 15. If the transparent member 66 is not provided, a prism action is induced by the half-mirror coated surfaces 14 and 15 of the transparent optical member 65, causing color dispersion.

In the arrangement shown in FIG. 33, light from the display device 12 (13) makes a round trip through the width of the transparent optical member 65 and then emanates from the transparent member (66) side of the transparent optical member 65 to enter the eye E. Although in FIG. 33 the eye-side surface of the transparent member 66 is a flat surface, it may be curved for aberration correction.

In addition, a transparent member 67 having the same refractive index as that of the transparent optical member 65 is cemented to the concave half-mirror side surface of the transparent optical member 65 to prevent occurrence of a lens action at this surface. When the outside world is to be viewed, the liquid crystal shutter 62, which is disposed on the side of the concave half-mirror 60 which is remote from the eye E, is switched to a transparent state. It is preferable for the transparent member 67 to have a power which is opposite in sign to the composite power of the transparent members 65 and 66. In this case, the total power of the transparent members 65, 66 and 67 becomes zero. Therefore, the outside world can be seen correctly.

In this embodiment, half-mirror coating is provided on both the obverse and reverse surfaces of the transparent optical member 65. Therefore, assembling the device is facilitated in comparison to the seventeenth embodiment, for example. In addition, this embodiment has an advantage in that the distance (eye relief) from the final optical surface to the pupil position becomes long.

Figure 34:
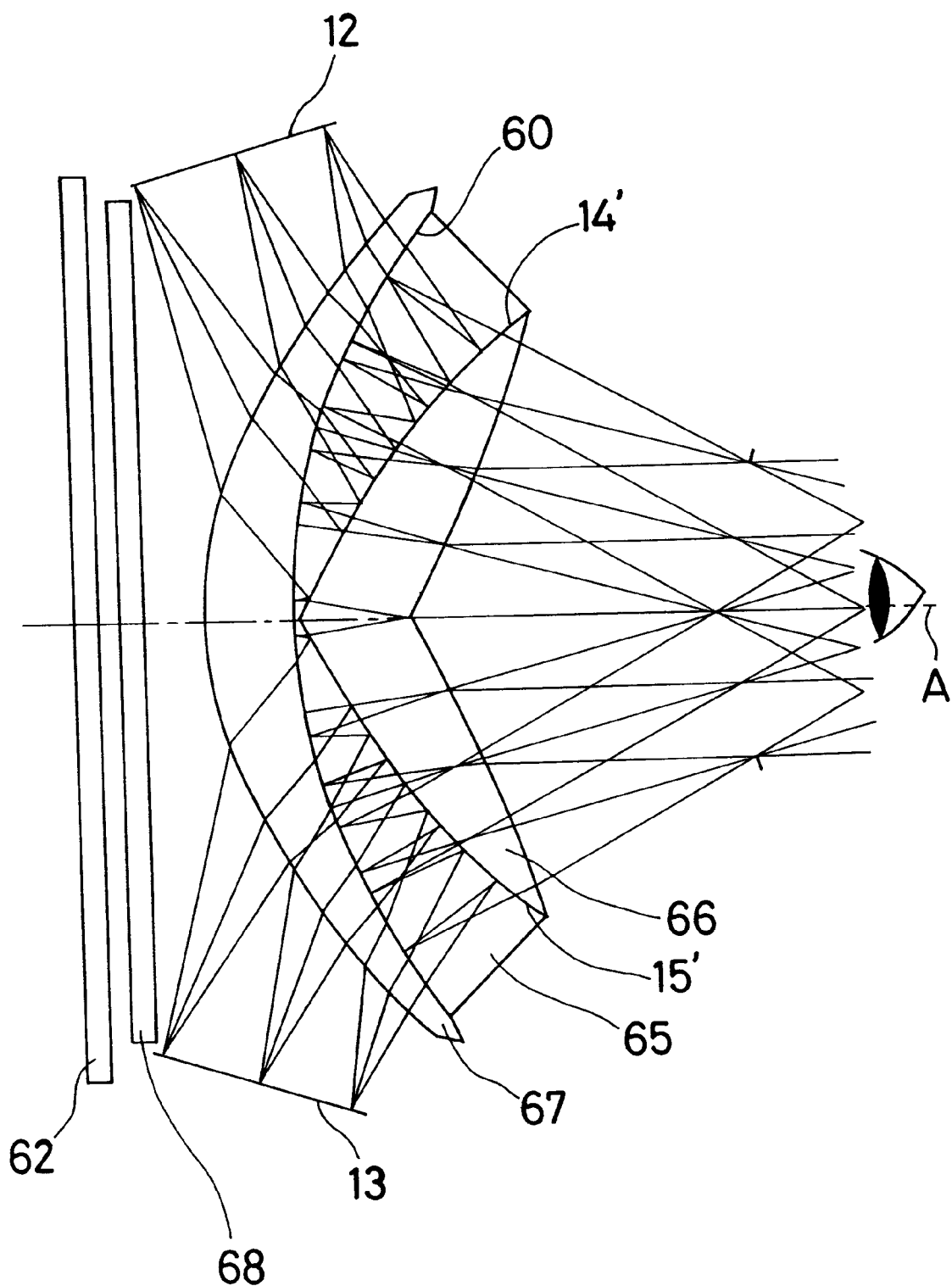
FIG. 34 is a sectional view of an optical system in a twenty-first embodiment of the visual display apparatus according to the present invention.

Twenty-first Embodiment:

FIG. 34 shows the optical system of a twenty-first embodiment of the present invention. In this embodiment, the V-shaped flat surfaces of the plane half-mirrors 14 and 15 provided on the transparent optical member 65 in the twentieth embodiment are replaced by V-shaped half-mirrors 14' and 15' each having a curved half-mirror surface, and the eye-side surface of the transparent member 66 is formed into a V-shaped flat surface. In addition, the outer surface of the transparent member 67 is provided with a power, and the refractive index of the transparent member 67 is made different from the refractive index of the transparent optical member 65, thereby minimizing the amount of aberration of the image displayed for the eye E. In addition, a Fresnel lens 68 is inserted between the liquid crystal shutter 62 and the transparent member 66 so that the power of the Fresnel lens 68 cancels the total power of the transparent members 65, 66 and 67. Thus, the outside world can be seen correctly.

Figure 35:
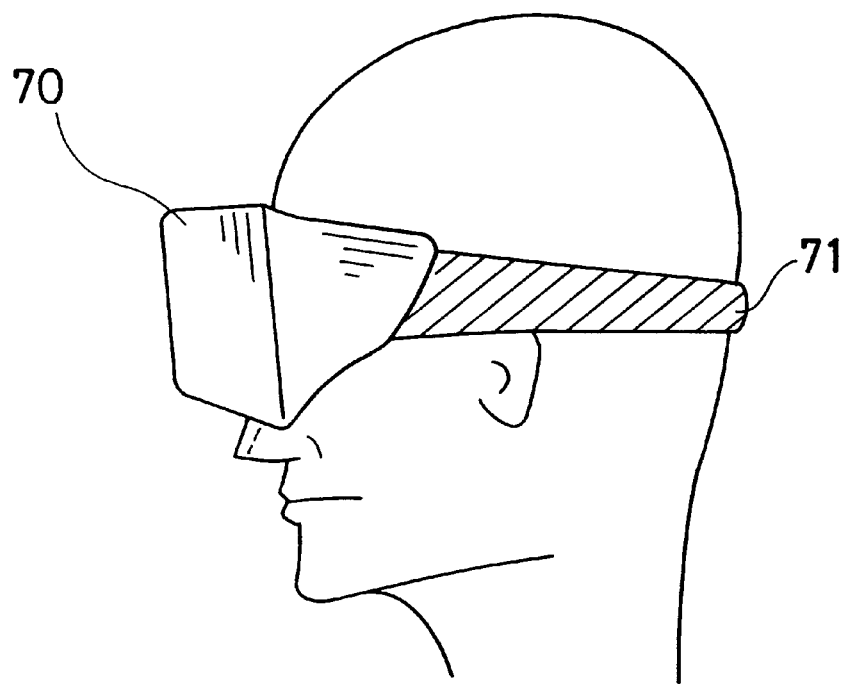
FIG. 35 is a perspective view of the visual display apparatus of the present invention when it is arranged in the form of a head-mounted display apparatus.

Although the visual display apparatus of the present invention has been described by way of some embodiments, it should be noted that the present invention is not necessarily limited to these embodiments, and that various changes and modifications may be imparted thereto. When the visual display apparatus of the present invention is arranged in the form of a head-mounted display apparatus in actual use, an arrangement such as that shown in the perspective view of FIG. 35 may be adopted. That is, a face-mounted unit 70 that is equipped with the optical system in any of the foregoing embodiments is mounted on the observer's head using a headband, for example, as a support member 71.

Figure 36:
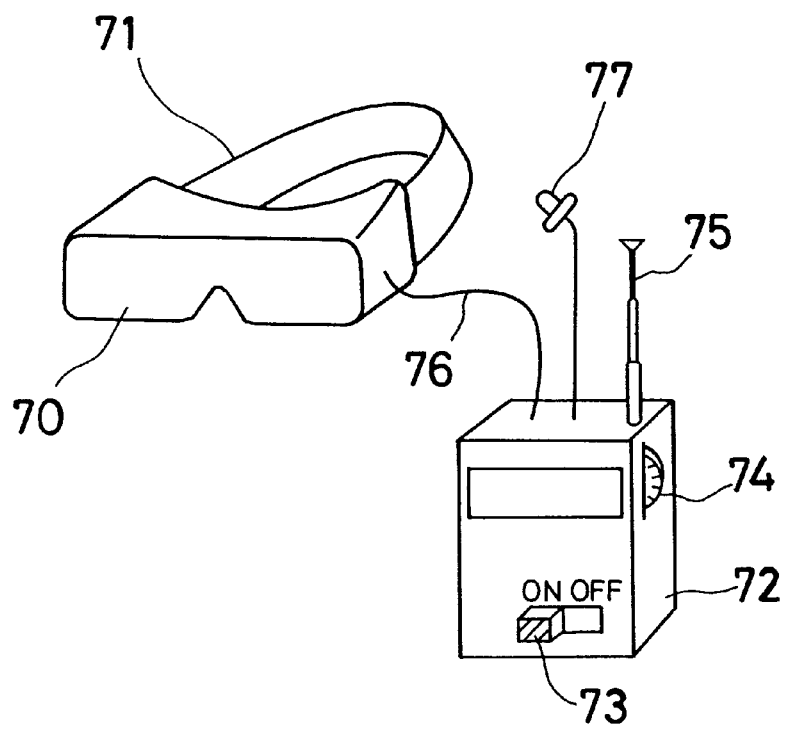
FIG. 36 shows one example of a specific arrangement of the visual display apparatus of the present invention when arranged in the form of a head-mounted display apparatus.

The following is a description of examples of specific arrangements usable when the foregoing visual display apparatus is arranged in the form of a head-mounted display apparatus. FIG. 36 shows an arrangement for displaying an image on the two-dimensional display devices 12 and 13, e.g., liquid crystal display devices, of the visual display apparatus. When a switch 73 of a TV signal receiving device 72, for example, is turned on, a TV signal of the channel that has been preset by actuating a TV channel selecting knob 74 is received by an antenna 75. The image is reproduced on the screens of the image display devices 12 and 13, e.g., liquid crystal display devices, small-sized CRT displays, etc., provided in a goggle-type face-mounted unit 70, through a cord 76. The image is displayed by an optical arrangement such as that in the foregoing embodiments. In addition, the device 72 is provided with an earphone 77 to enable the user to listen to the TV sound.

Figure 37:
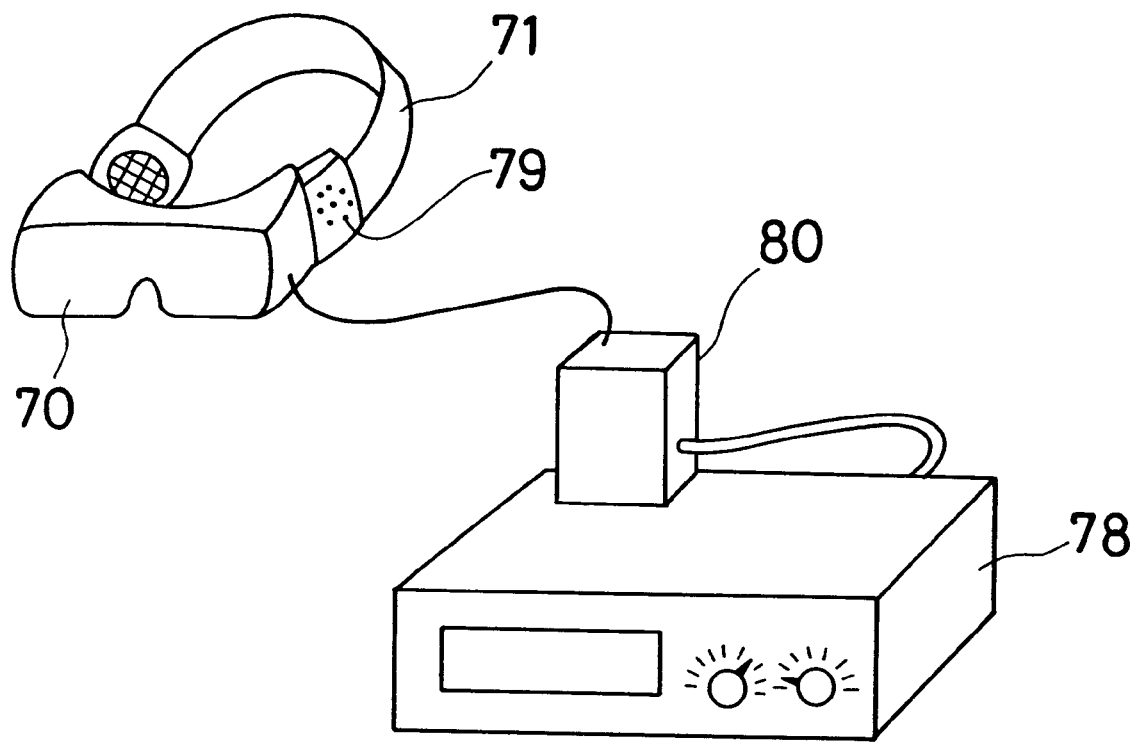
FIG. 37 shows one example of another specific arrangement of the visual display apparatus of the present invention when arranged in the form of a head-mounted display apparatus.
Figure 38:
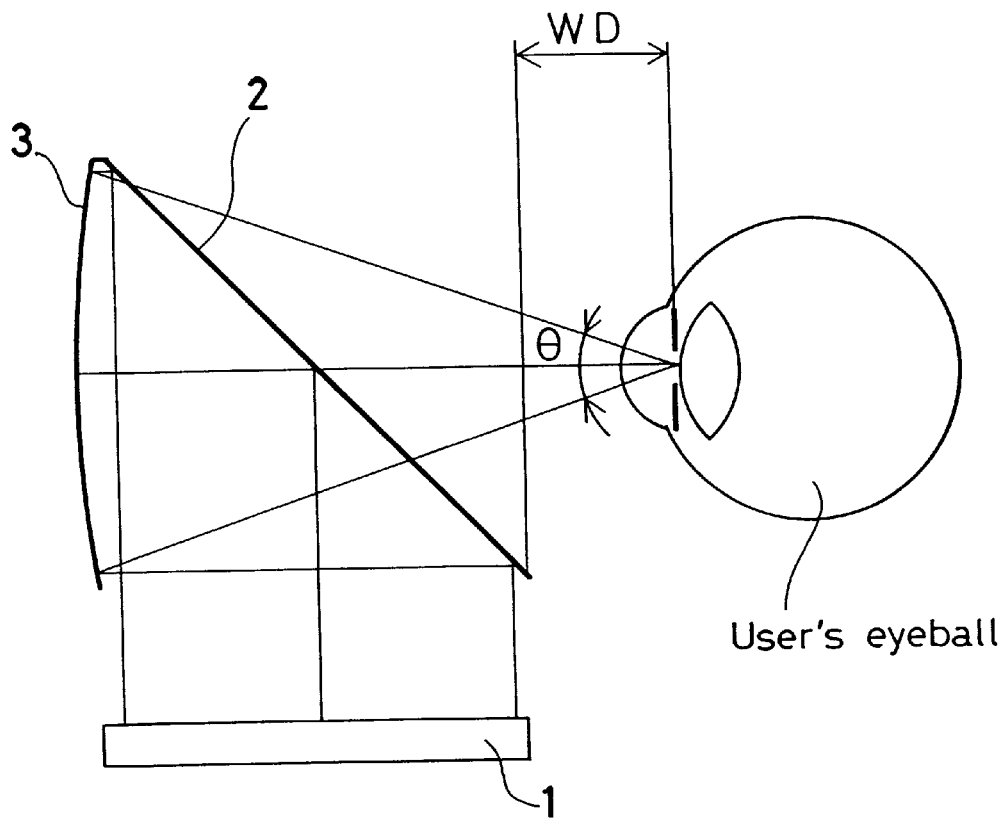
FIG. 38 shows an essential part of a conventional head-mounted display apparatus.
Figure 39:
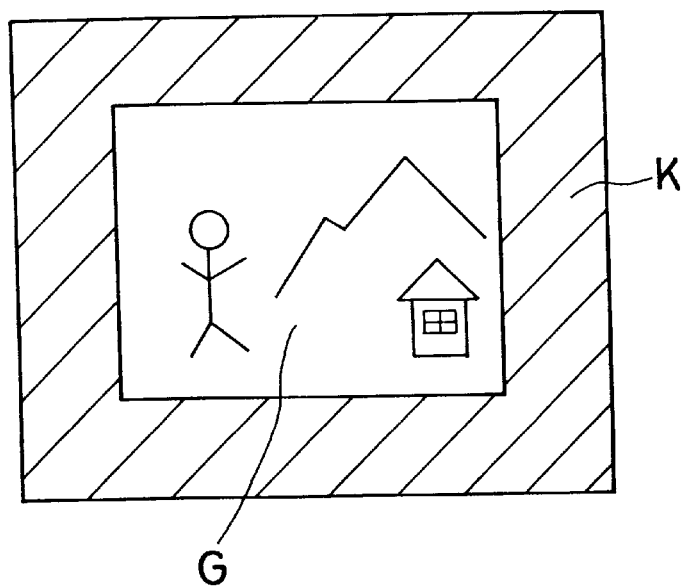
FIG. 39 is a front view of a single liquid crystal display device.

It should be noted that the head-mounted display apparatus according to the present invention is not necessarily limited to the above-described TV signal receiving device. Another example of the head-mounted display apparatus is shown in FIG. 37. In the arrangement shown in FIG. 37, an image processing device 80 is connected to an existing video reproducing device 78 to transmit an image to the image display devices 12 and 13 in the face-mounted unit 70. In this case, no earphone is provided as a separate member, but a headphone 79 is attached to a rubber band provided as a support member 71 for the face-mounted unit 70 instead. It should be noted that the TV signal receiving device 72 and the face-mounted unit 70, shown in FIG. 36, may be provided as one integrated unit.

Although the visual display apparatus of the present invention has been described by way of some embodiments, it should be noted that the present invention is not necessarily limited to these embodiments, and that various changes and modifications may be imparted thereto.

As will be clear from the foregoing description, it is possible according to the present invention to provide a visual display apparatus, for example, a head-mounted display apparatus, which has a compact optical system and yet enables the user to observe an image at a wide field angle and high resolution.

In addition, when a concave half-mirror is disposed between two display devices and two plane half-mirrors, the display devices and the concave half-mirror can be brought close to each other without mechanical interference and eclipse. Therefore, the field angle can be widened. In addition, since there is nothing in the arrangement that prevents an increase in size of the concave half-mirror, it is possible to increase the size of the concave half-mirror and hence possible to enlarge the pupil diameter.

What we claim is:

1. A visual display apparatus, comprising:

a two-dimensional display; and an ocular optical system that leads an image formed by said two-dimensional display to either one of a right or left eye of an observer, wherein said two-dimensional display includes a first image display device that displays an image of approximately a half of an observation image to be viewed by said observer and a second image display device that displays an image of approximately a remaining half of said observation image, said ocular optical system includes a first reflecting surface that reflects light rays from said first image display device, a second reflecting surface that reflects light rays from said second image display device in a same direction as a direction in which said first reflecting surface reflects the light rays from said first image display device, and a magnifying reflecting member disposed in the direction of the light rays reflected by said first reflecting surface and second reflecting surface to reflect said light rays toward an observer's eyeball such that the image displayed by said first image display device and the image displayed by said second image display device are in a side by side relationship to each other as an enlarged image, said magnifying reflecting member is arranged such that when the image displayed by said first image display device and the image displayed by said second image display device are projected in a side-by-side relationship to each other, said two images overlap each other at a central portion of said observation image, and the image displayed by said first image display device and the image displayed by said second image display device are approximately left and right halves, respectively, of said observation image.

2. A visual display apparatus, comprising:

a two-dimensional display, and an ocular optical system that leads an image formed by said two-dimensional display to either one of a right or left eye of an observer, wherein said two-dimensional display includes a first image display device that displays an image of approximately a half of an observation image to be viewed by said observer and a second image display device that displays an image of approximately a remaining half of said observation image, said ocular optical system includes a first reflecting surface that reflects light rays from said first image display device, a second reflecting surface that reflects light rays from said second image display device in a same direction as a direction in which said first reflecting surface reflects the light rays from said first image display device, and a magnifying reflecting member disposed in the direction of the light rays reflected by said first reflecting surface and second reflecting surface to reflect said light rays toward an observer's eyeball such that the image displayed by said first image display device and the image displayed by said second image display device are in a side by side relationship to each other as an enlarged image, said magnifying reflecting member is arranged such that when the image displayed by said first image display device and the image displayed by said second image display device are projected in a side-by-side relationship to each other, said two images overlap each other at a central portion of said observation image, and the image displayed by said first image display device and the image displayed by said second image display device are approximately upper and lower halves, respectively, of said observation image.

3. A visual display apparatus, comprising:

a two-dimensional display; and an ocular optical system that leads an image formed by said two-dimensional display to either one of a right or left eye of an observer, wherein said two-dimensional display means includes a first image display device that displays an image of approximately a half of an observation image to be viewed by said observer and a second image display device that displays an image of approximately a remaining half of said observation image, said ocular optical system includes a first reflecting surface that reflects light rays from said first image display device, a second reflecting surface that reflects light rays from said second image display device in a same direction as a direction in which said first reflecting surface reflects the light rays from said first image display device, and a magnifying reflecting member disposed in the direction of the light rays reflected by said first reflecting surface and second reflecting surface to reflect said light rays toward an observer's eyeball such that the image displayed by said first image display device and the image displayed by said second image display device are in a side by side relationship to each other as an enlarged image, and said ocular optical system is arranged such that light rays emitted from said first image display device are reflected by said first reflecting surface, further reflected by said magnifying reflecting member and pass through said first reflecting surface to lead the image of approximately a half of said observation image to said observer's eyeball, and that light rays emitted from said second image display device are reflected by said second reflecting surface, further reflected by said magnifying reflecting member and pass through said second reflecting surface to lead the image of approximately a remaining half of said observation image to said observer's eyeball.

4. A visual display apparatus according to claim 3, wherein said first image display device and said second image display device are disposed to face each other vertically across a visual axis of said observer, and said first reflecting surface and said second reflected surface are disposed in a V shape between said first image display device and said second image display device.

5. A visual display apparatus according to claim 3 or 4, wherein said magnifying reflecting member is arranged such that when the image displayed by said first image display device and the image displayed by said second image display device are projected in a side-by-side relationship to each other, said two images overlap each other at a central portion of said observation image.

6. A visual display apparatus according to claim 1, 2, 3, or 4, wherein said first reflecting surface and said second reflecting surface are semitransparent reflecting surfaces.

7. A visual display apparatus according to claim 1, 2, 3, or 4, wherein said magnifying reflecting member is a concave mirror.

8. A visual display apparatus according to claim 1, 2, 3, or 4, wherein said first reflecting surface, said second reflecting surface and said magnifying reflecting member are formed from a prism member.

9. A visual display apparatus according to claim 8, wherein said magnifying reflecting member is a back-coated reflecting surface that forms one surface of said prism member.

10. A visual display apparatus according to claim 1, 2, 3, or 4, wherein said first reflecting surface and said second reflecting surface are formed from a prism member, and said magnifying reflecting member is a back-coated reflecting member having a transmitting surface and a reflecting surface which are disposed to face each other across a medium.

11. A visual display apparatus according to claim 1, 2, 3, or 4, wherein said ocular optical system has a positive lens disposed between said first and second image display devices on one hand and said observer's eyeball on the other.

12. A biocular visual display apparatus, comprising:
  a first visual display apparatus disposed in front of a right eye of an observer; and
  a second visual display apparatus disposed in front of a left eye of said observer, thereby enabling biocular observation,
  wherein said fist and second visual display apparatuses are disposed substantially parallel to each other, said first and second visual display apparatuses comprising:
    a two-dimensional display, and
    an ocular optical system that leads an image formed by said two-dimensional display to either one of a right or left eye of an observer,
    said two-dimensional display includes a first image display device that displays an image of approximately a half of an observation image to be viewed by said observer and a second image display device that displays an image of approximately a remaining half of said observation image, and
    said ocular optical system includes a first reflecting surface that reflects light rays from said first image display device, a second reflecting surface that reflects light rays from said second image display device in a same direction as a direction in which said first reflecting surface reflects the light rays from said first image display device, and a magnifying reflecting member disposed in the direction of the light rays reflected by said first reflecting surface and second reflecting surface to reflect said light rays toward an observer's eyeball such that the image displayed by said first image display device and the image displayed by said second image display device are in a side by side relationship to each other as an enlarged image,
  said magnifying reflecting member is arranged such that when the image displayed by said first image display device and the image displayed by said second image display device are projected in a side-by-side relationship to each other, said two images overlap each other at a central portion of said observation image, and
  the image displayed by said first image display device and the image displayed by said second image display device are approximately left and right halves, respectively, of said observation image.

13. A biocular visual display apparatus, comprising:
  a first visual display apparatus disposed in front of a right eye of an observer; and
  a second visual display apparatus disposed in front of a left eye of said observer, thereby enabling biocular observation,
  wherein said fist and second visual display apparatuses are disposed substantially parallel to each other, said first and second visual display apparatuses comprising:
    a two-dimensional display, and
    an ocular optical system that leads an image formed by said two-dimensional display to either one of a right or left eye of an observer,
    said two-dimensional display includes a first image display device that displays an image of approximately a half of an observation image to be viewed by said observer and a second image display device that displays an image of approximately a remaining half of said observation image, and
    said ocular optical system includes a first reflecting surface that reflects light rays from said first image display device, a second reflecting surface that reflects light rays from said second image display device in a same direction as a direction in which said first reflecting surface reflects the light rays from said first image display device, and a magnifying reflecting member disposed in the direction of the light rays reflected by said first reflecting surface and second reflecting surface to reflect said light rays toward an observer's eyeball such that the image displayed by said first image display device and the image displayed by said second image display device are in a side by side relationship to each other as an enlarged image,
  said magnifying reflecting member is arranged such that when the image displayed by said first image display device and the image displayed by said second image display device are projected in a side-by-side relationship to each other, said two images overlap each other at a central portion of said observation image, and
  the image displayed by said first image display device and the image displayed by said second image display device are approximately upper and lower halves, respectively, of said observation image.

14. A biocular visual display apparatus, comprising:
  a first visual display apparatus disposed in front of a right eye of an observer; and
  a second visual display apparatus disposed in front of a left eye of said observer, thereby enabling biocular observation,
  wherein said fist and second visual display apparatuses are disposed substantially parallel to each other, said first and second visual display apparatuses comprising:

a two-dimensional display, and an ocular optical system that leads an image formed by said two-dimensional display to either one of a right or left eye of an observer, said two-dimensional display includes a first image display device that displays an image of approximately a half of an observation image to be viewed by said observer and a second image display device that displays an image of approximately a remaining half of said observation image, and said ocular optical system includes a first reflecting surface that reflects light rays from said first image display device, a second reflecting surface that reflects light rays from said second image display device in a same direction as a direction in which said first reflecting surface reflects the light rays from said first image display device, and a magnifying reflecting member disposed in the direction of the light rays reflected by said first reflecting surface and second reflecting surface to reflect said light rays toward an observer's eyeball such that the image displayed by said first image display device and the image displayed by said second image display device are in a side by side relationship to each other as an enlarged image, and said ocular optical system is arranged such that light rays emitted from said first image display device are reflected by said first reflecting surface, further reflected by said magnifying reflecting member and pass through said first reflecting surface to lead the image of approximately a half of said observation image to said observer's eyeball, and that light rays emitted from said second image display device are reflected by said second reflecting surface, further reflected by said magnifying reflecting member and pass through said second reflecting surface to lead the image of approximately a remaining half of said observation image to said observer's eyeball.

15. A biocular visual display apparatus according to claim 14, wherein said first image display device and said second image display device are disposed to face each other vertically across a visual axis of said observer, and said first reflecting surface and said second reflected surface are disposed in a V shape between said first image display device and said second image display device.

16. A biocular visual display apparatus according to claim 14 or 15, wherein said magnifying reflecting member is arranged such that when the image displayed by said first image display device and the image displayed by said second image display device are projected in a side-by-side relationship to each other, said two images overlap each other at a central portion of said observation image.

17. A biocular visual display apparatus according to claim 12, 13, 14, or 15,
wherein said first reflecting surface and said second reflecting surface are semitransparent reflecting surfaces.

18. A biocular visual display apparatus according to claim 12, 13, 14, or 15,
wherein said magnifying reflecting member is a concave mirror.

19. A biocular visual display apparatus according to claim 12, 13, 14, or 15,
wherein said first reflecting surface, said second reflecting surface and said magnifying reflecting member are formed from a prism member.

20. A biocular visual display apparatus according to claim 19, wherein said magnifying reflecting member is a back-coated reflecting surface that forms one surface of said prism member.

21. A biocular visual display apparatus according to claim 12, 13, 14, or 15,
wherein said first reflecting surface and said second reflecting surface are formed from a prism member, and said magnifying reflecting member is a back-coated reflecting member having a transmitting surface and a reflecting surface which are disposed to face each other across a medium.

22. A biocular visual display apparatus according to claim 12, 13, 14, or 15,
wherein said ocular optical system has a positive lens disposed between said first and second image display devices on one hand and said observer's eyeball on the other.

23. A face-mounted image display system, comprising:
a face-mounted unit;
a left visual display apparatus disposed in a left eye position of said face-mounted unit;
a right visual display apparatus disposed in a right eye position of said face-mounted unit such that said right visual display apparatus is in a side-by-side relationship with said left visual display apparatus;
a support means that supports said face-mounted unit on a head of said observer; and
an audio means that transmits sound to an ear of said observer,
said left and right visual display apparatus comprising:
a two-dimensional display, and
an ocular optical system that leads an image formed by said two-dimensional display to either one of a right or left eye of an observer,
said two-dimensional display includes a first image display device that displays an image of approximately a half of an observation image to be viewed by said observer and a second image display device that displays an image of approximately a remaining half of said observation image, and
said ocular optical system includes a first reflecting surface that reflects light rays from said first image display device, a second reflecting surface that reflects light rays from said second image display device in a same direction as a direction in which said first reflecting surface reflects the light rays from said first image display device, and a magnifying reflecting member disposed in the direction of the light rays reflected by said first reflecting surface and second reflecting surface to reflect said light rays toward an observer's eyeball such that the image displayed by said first image display device and the image displayed by said second image display device are in a side by side relationship to each other as an enlarged image,
said magnifying reflecting member is arranged such that when the image displayed by said first image display device and the image displayed by said second image display device are projected in a side-by-side relationship to each other, said two images overlap each other at a central portion of said observation image, and
the image displayed by said first image display device and the image displayed by said second image display device are approximately left and right halves, respectively, of said observation image.

24. A face-mounted image display system, comprising:
a face-mounted unit;
a left visual display apparatus disposed in a left eye position of said face-mounted unit;

a right visual display apparatus disposed in a right eye position of said face-mounted unit such that said right visual display apparatus is in a side-by-side relationship with said left visual display apparatus;

a support means that supports said face-mounted unit on a head of said observer; and an audio means that transmits sound to an ear of said observer, said left and right visual display apparatus comprising:
a two-dimensional display, and
an ocular optical system that leads an image formed by said two-dimensional display to either one of a right or left eye of an observer, said two-dimensional display includes a first image display device that displays an image of approximately a half of an observation image to be viewed by said observer and a second image display device that displays an image of approximately a remaining half of said observation image, and said ocular optical system includes a first reflecting surface that reflects light rays from said first image display device, a second reflecting surface that reflects light rays from said second image display device in a same direction as a direction in which said first reflecting surface reflects the light rays from said first image display device, and a magnifying reflecting member disposed in the direction of the light rays reflected by said first reflecting surface and second reflecting surface to reflect said light rays toward an observer's eyeball such that the image displayed by said first image display device and the image displayed by said second image display device are in a side by side relationship to each other as an enlarged image, said magnifying reflecting member is arranged such that when the image displayed by said first image display device and the image displayed by said second image display device are projected in a side-by-side relationship to each other, said two images overlap each other at a central portion of said observation image, and the image displayed by said first image display device and the image displayed by said second image display device are approximately upper and lower halves, respectively, of said observation image.

25. A face-mounted image display system, comprising:
a face-mounted unit;
a left visual display apparatus disposed in a left eye position of said face-mounted unit;
a right visual display apparatus disposed in a right eye position of said face-mounted unit such that said right visual display apparatus is in a side-by-side relationship with said left visual display apparatus;
a support means that supports said face-mounted unit on a head of said observer; and
an audio means that transmits sound to an ear of said observer,
said left and right visual display apparatus comprising:
a two-dimensional display, and
an ocular optical system that leads an image formed by said two-dimensional display to either one of a right or left eye of an observer, said two-dimensional display includes a first image display device that displays an image of approximately a half of an observation image to be viewed by said observer and a second image display device that displays an image of approximately a remaining half of said observation image, and said ocular optical system includes a first reflecting surface that reflects light rays from said first image display device, a second reflecting surface that reflects light rays from said second image display device in a same direction as a direction in which said first reflecting surface reflects the light rays from said first image display device, and a magnifying reflecting member disposed in the direction of the light rays reflected by said first reflecting surface and second reflecting surface to reflect said light rays toward an observer's eyeball such that the image displayed by said first image display device and the image displayed by said second image display device are in a side by side relationship to each other as an enlarged image, and said ocular optical system is arranged such that light rays emitted from said first image display device are reflected by said first reflecting surface, further reflected by said magnifying reflecting member and pass through said first reflecting surface to lead the image of approximately a half of said observation image to said observer's eyeball, and that light rays emitted from said second image display device are reflected by said second reflecting surface, further reflected by said magnifying reflecting member and pass through said second reflecting surface to lead the image of approximately a remaining half of said observation image to said observer's eyeball.

26. A face-mounted image display system according to claim 25, wherein said first image display device and said second image display device are disposed to face each other vertically across a visual axis of said observer, and said first reflecting surface and said second reflected surface are disposed in a V shape between said first image display device and said second image display device.

27. A face-mounted image display system according to claim 25 or 26,
wherein said magnifying reflecting member is arranged such that when the image displayed by said first image display device and the image displayed by said second image display device are projected in a side-by-side relationship to each other, said two images overlap each other at a central portion of said observation image.

28. A face-mounted image display system according to claim 23, 24, 25, or 26,
wherein said first reflecting surface and said second reflecting surface are semitransparent reflecting surfaces.

29. A face-mounted image display system according to claim 23, 24, 25, or 26,
wherein said magnifying reflecting member is a concave mirror.

30. A face-mounted image display system according to claim 23, 24, 25, or 26,
wherein said first reflecting surface, said second reflecting surface and said magnifying reflecting member are formed from a prism member.

31. A face-mounted image display system according to claim 30, wherein said magnifying reflecting member is a back-coated reflecting surface that forms one surface of said prism member.

32. A face-mounted image display system according to claim 23, 24, 25, or 26,
wherein said first reflecting surface and said second reflecting surface are formed from a prism member, and said magnifying reflecting member is a back-coated reflecting member having a transmitting surface and a reflecting surface which are disposed to face each other across a medium.

33. A face-mounted image display system according to claim 23, 24, 25, or 26, wherein said ocular optical system has a positive lens disposed between said first and second image display devices on one hand and said observer's eyeball on the other.

34. A face-mounted image display system according to claim 23, 24, 25, or 26, wherein said audio means is provided on said support means.

35. A face-mounted image display system according to claim 34, wherein said audio means is a headphone.

36. A face-mounted image display system according to claim 34, wherein said audio means is an earphone.

* * * * *